(12) United States Patent
Ross et al.

(10) Patent No.: US 8,483,240 B2
(45) Date of Patent: Jul. 9, 2013

(54) PIGGYBACK NETWORKS

(75) Inventors: John Anderson Fergus Ross, Niskayuna, NY (US); Michael James Hartman, Clifton Park, NY (US); Harold Woodruff Tomlinson, Jr., Ballson Spa, NY (US); John Erik Hershey, Ballston Lake, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1214 days.

(21) Appl. No.: 11/640,994

(22) Filed: Dec. 19, 2006

(65) Prior Publication Data

US 2008/0144666 A1   Jun. 19, 2008

(51) Int. Cl.
*H04B 7/204* (2006.01)

(52) U.S. Cl.
USPC .......................................................... 370/477

(58) Field of Classification Search
USPC ............................... 370/477, 473, 479
See application file for complete search history.

(56) References Cited

U.S. PATENT DOCUMENTS

| 6,154,661 | A * | 11/2000 | Goldburg ................... 455/562.1 |
| 6,175,588 | B1 * | 1/2001 | Visotsky et al. .............. 375/148 |
| 6,351,500 | B2 * | 2/2002 | Kumar ........................... 375/270 |
| 6,532,252 | B1 * | 3/2003 | Moon et al. .................... 375/144 |
| 6,597,923 | B1 * | 7/2003 | Vanghi et al. .................. 455/522 |
| 6,885,711 | B2 | 4/2005 | Shiu et al. |
| 7,057,514 | B2 * | 6/2006 | Mickle et al. ................ 340/572.7 |
| 7,120,123 | B1 | 10/2006 | Quigley et al. |
| 7,519,054 | B2 * | 4/2009 | Varma ............................ 370/388 |
| 2003/0026357 | A1 | 2/2003 | Bartlett et al. |
| 2004/0233918 | A1 * | 11/2004 | Larsson et al. ................ 370/400 |
| 2005/0163155 | A1 * | 7/2005 | Yang et al. ..................... 370/465 |
| 2005/0185729 | A1 * | 8/2005 | Mills .............................. 375/267 |
| 2005/0237992 | A1 | 10/2005 | Mishra et al. |
| 2005/0259723 | A1 * | 11/2005 | Blanchard ..................... 375/146 |
| 2006/0135081 | A1 | 6/2006 | Mysore et al. |
| 2006/0230238 | A1 * | 10/2006 | Roy et al. ....................... 711/141 |
| 2006/0252443 | A1 * | 11/2006 | Sammour et al. ............. 455/518 |
| 2006/0265491 | A1 * | 11/2006 | Litwin ........................... 709/224 |
| 2007/0060167 | A1 * | 3/2007 | Damnjanovic et al. ........ 455/450 |

OTHER PUBLICATIONS

Cover, T.M. and Thomas, J.A., *Elements of Information Theory*, New York: John Wile & Sons, Chapter 14, 374-458 (1991).
Chen, S., Beach, M., McGeehan, J., "Division-free duplex for wireless applications" *Electronics Letters*, 34(2), 14-148 (1998).
International Search Report issued for PCT Application No. PCT/US07/25825, dated Apr. 24, 2008.

(Continued)

*Primary Examiner* — Mark Rinehart
*Assistant Examiner* — Mohammad Anwar
(74) *Attorney, Agent, or Firm* — Nixon & Vanderhye PC

(57) ABSTRACT

Systems and/or methods for relaying messages between nodes in a network (e.g. a wireless network) are provided. In accordance with certain exemplary embodiments, substantially simultaneous communications between nodes may be accomplished. At least one secondary message may be piggybacked onto a primary message. Messages in the network may be queued and sent from a transmitter to at least one receiver based at least in part on the signal-to-noise ratio(s) of the receiver nodes with respect to the transmitter. The queuing of the messages may be performed in dependence on a link set that indicates which messages are capable of piggyback communications. Thus, it may be possible to realize a network that reduces collision problems, reduces delays in communications, and/or increases throughput.

38 Claims, 12 Drawing Sheets

OTHER PUBLICATIONS

Cover, T.M., "Comments on Broadcast Channels", *IEEE Transactions on Information Theory*, 44(6):2524-2530 (1998).

Jung, K. and Shea, J.M., "Simulcast Packet Transmission in Ad Hoc Networks", *IEEE Journal on Selected Areas in Communications*, 23(3):486-495 (2005.

Cover, T.M., "Broadcast Channels", *IEEE Transactions on Information Theory*, 18:2-14 (1972).

Ephremides, A. and Hajek, B., "Information Theory and Communication Networks: An Unconsummated Union", *IEEE Transactions on Information Theory*, 44(6):2416-2434 (1998).

Liang-Liang, X. and Kumar, P.R., "A Network Information Theory of Wireless Communication: Scaling Laws and Optimal Operation", *IEEE Transactions on Information Theory*, 50(5):748-767 (2004).

Gupta, P. and P.R. Kumar. "Towards an Information Theory of Large Networks: An Achievable Rate Region." *IEEE Transactions on Information Theory*. 49.8, Aug. 2003.

U.S. Appl. No. 11/640,952, filed Dec. 19, 1920, Ross et al.

International Preliminary Report on Patentability issued for PCT Application No. PCT/US2007/025825, dated Jun. 24, 2009.

Official Action issued for U.S. Appl. No. 11/640,952, dated Apr. 20, 2009.

\* cited by examiner

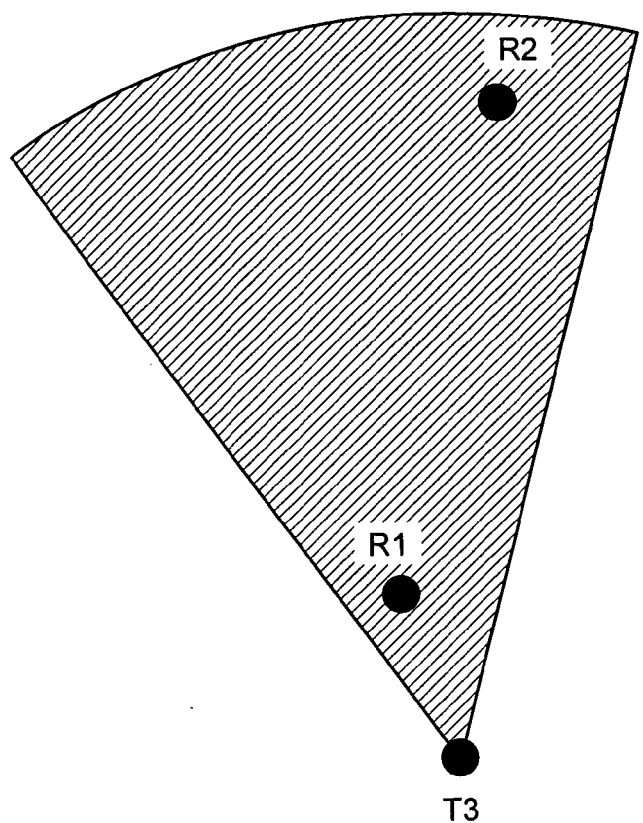
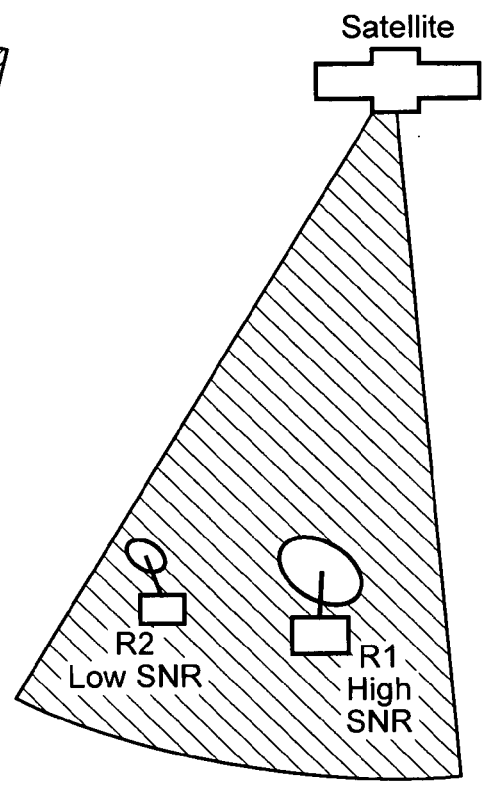
Fig. 1a
Fig. 1b
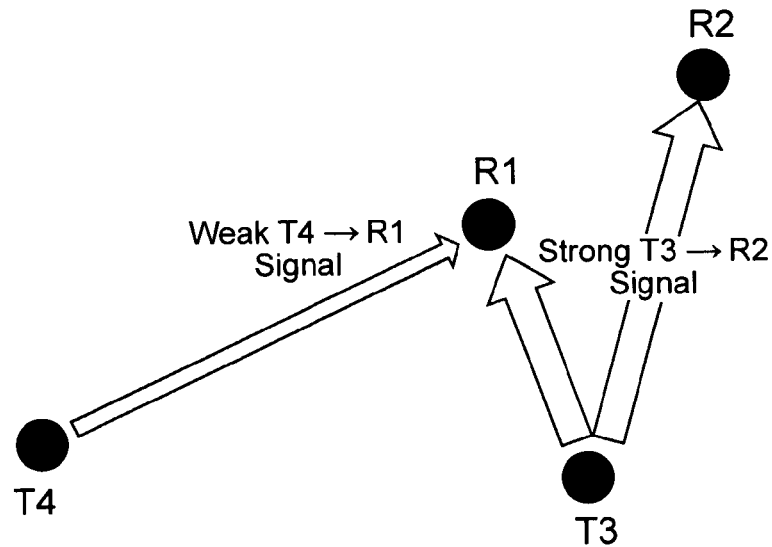
Fig. 2

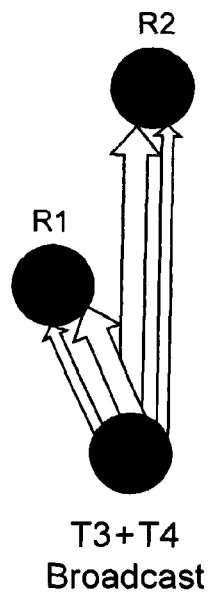
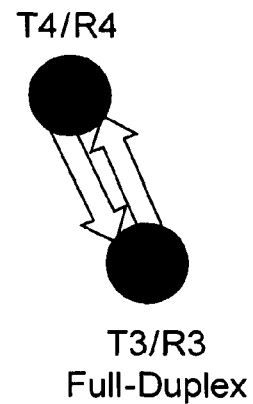
Fig. 3a
Fig. 3b
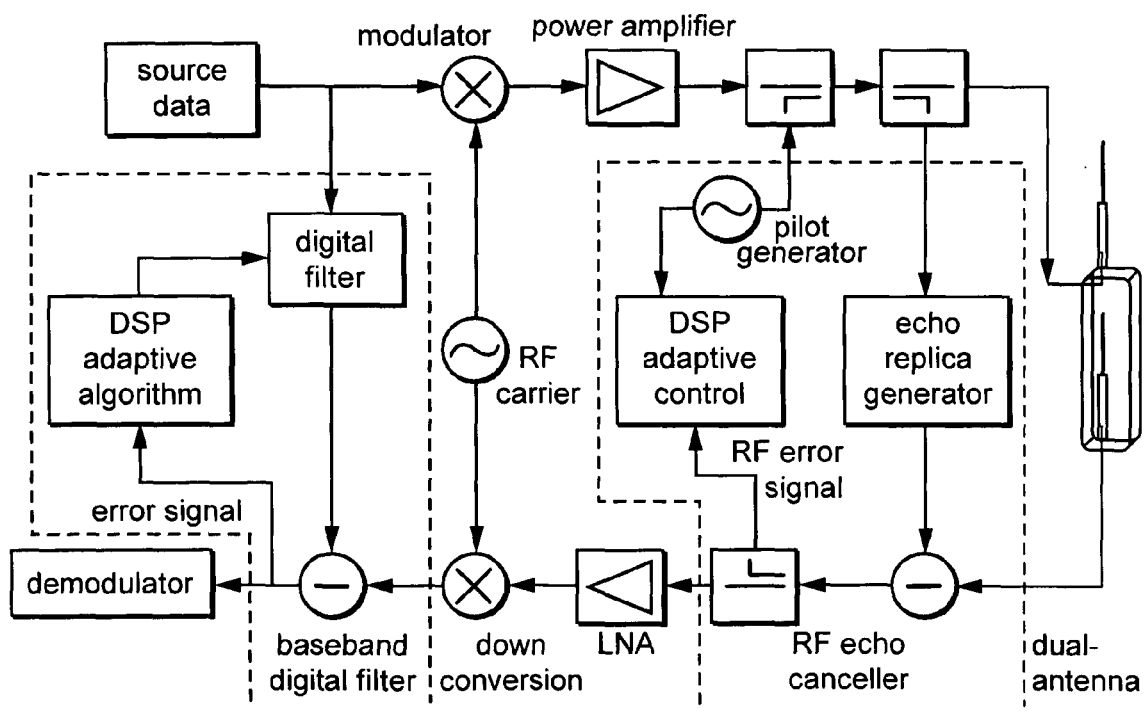
Fig. 3c

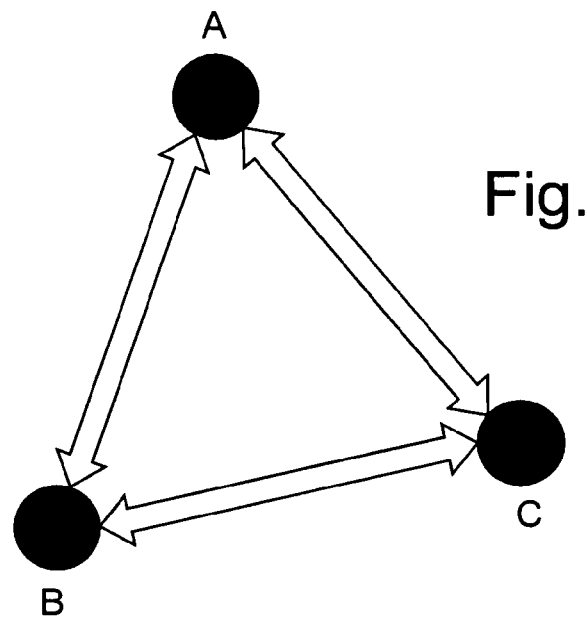
Fig. 8
Fig. 9
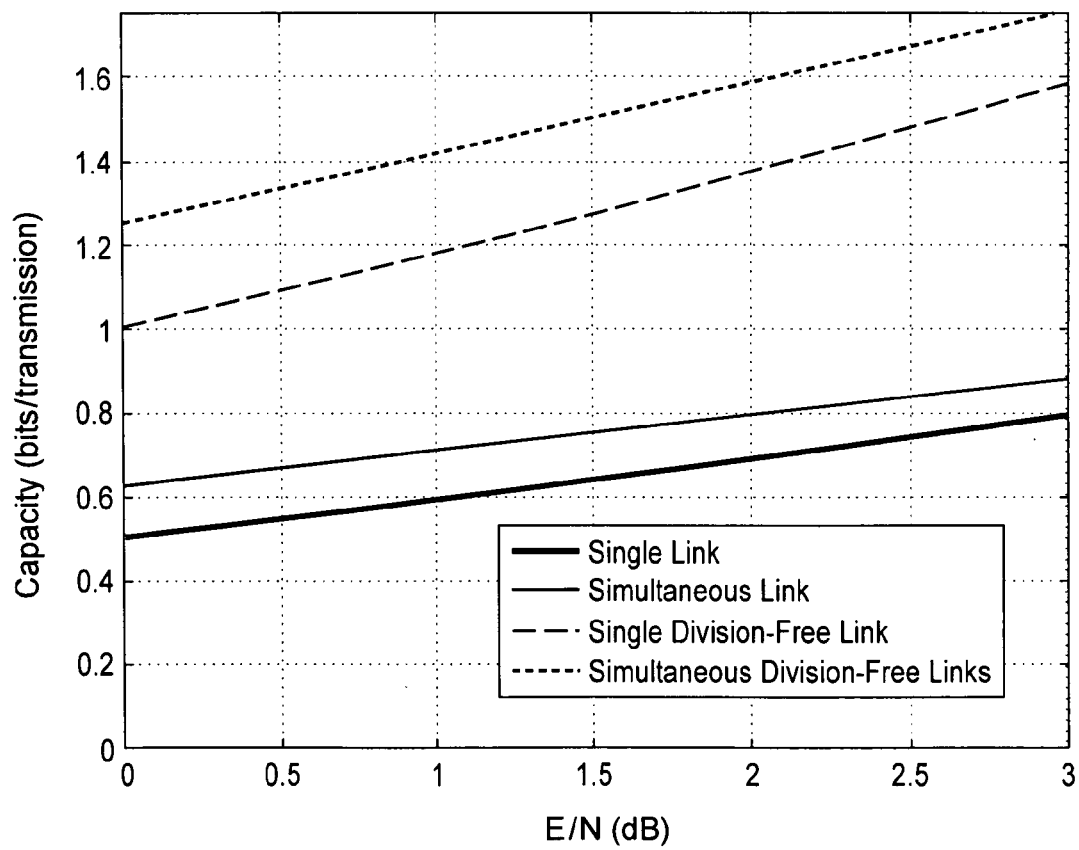

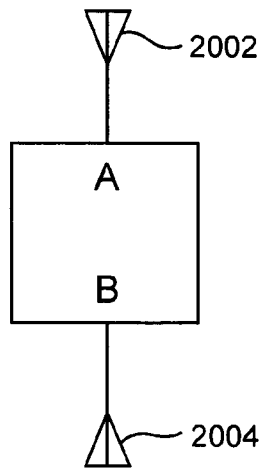
Fig. 20a
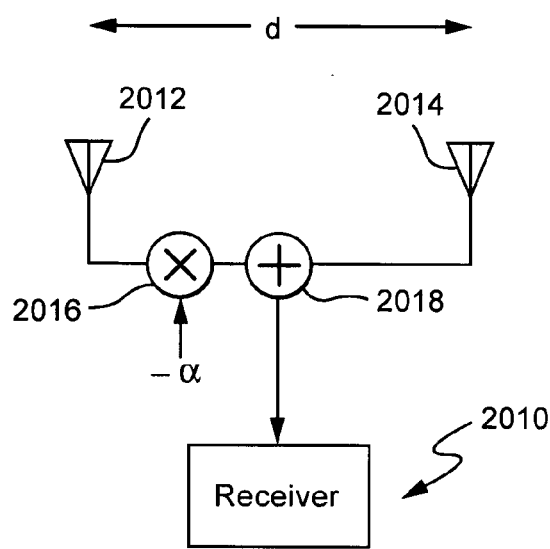
Fig. 20b
Fig. 21
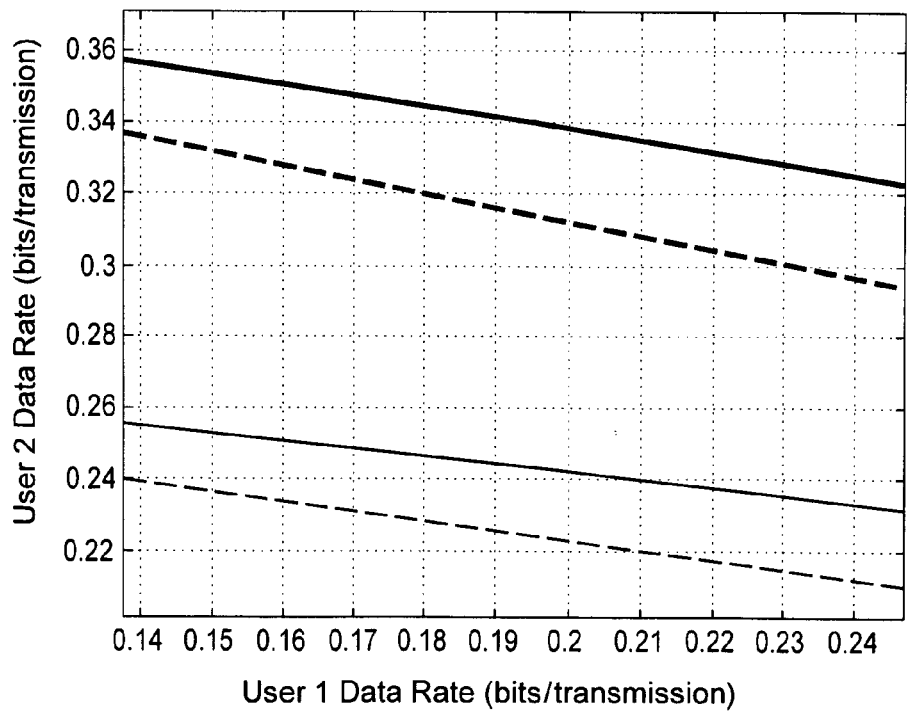

PIGGYBACK NETWORKS

FIELD OF THE INVENTION

The exemplary embodiments described herein relate to systems and/or methods for relaying messages between nodes in a network (e.g. a wireless network). More particularly, the exemplary embodiments relate to substantially simultaneous communications between nodes where at least one secondary message is piggybacked onto a primary message, and queued and sent from a transmitter to at least one receiver based at least in part on the signal-to-noise ratio(s) of the receiver nodes with respect to the transmitter. The queuing of the messages may be performed in dependence on a link set that indicates which messages are capable of piggyback communications.

BACKGROUND OF THE INVENTION

Networks typically include one or more nodes that are operable to transmit and receive messages. In a wireless network, for example, the RF output of a transmitter produces a broadcast region where signal reception is possible. Providing point-to-point information links is one of the basic problems associated with wireless communications. For example, as shown by FIG. 1a, receiver R1 and receiver R2 both are in the broadcast region of transmitter T3. The message to be communicated from transmitter T3 to receiver R1 may be different from the message to be communicated from transmitter T3 to receiver R2, thus requiring some form of signal isolation. One well-known solution to this problem relates to sending transmissions across different physical layers. For example, signals may be separated by frequency, time, or more generally, by waveforms that have low cross-correlation. Indeed, conventional communications technologies provide signal isolation using some form of orthogonal signaling.

There are many practical advantages associated with orthogonal signaling. Accordingly, alternatives rarely are considered, especially because non-orthogonal signaling may seem counterintuitive in some circumstances. Signaling in wireless networks may result in data collisions. For example, as networks become more complicated (e.g. by including multiple transmitters and receivers and allowing messages to travel across many paths at once), frames (which comprise the message to be communicated) collide or conflict. The heavier the communications volume, the worse the collision problems may become. The typical result is degradation of system efficiency, because when two frames collide the data contained in both frames usually is lost.

To coordinate wireless transmissions to nodes with overlapping wireless propagation paths, conventional networks have used contention arbitration protocols. Such protocols include, for example, the Aloha protocol. The Aloha protocol employs signals (sometimes referred to as beacons) that are sent at precise intervals, which indicate when the channel is clear to send a frame for each source. If a collision is expected, the transmitter may back off and try to send the frame later.

Numerous protocols have been developed to provide improvements and/or alternatives to the basic Aloha protocol and to solve the collision problem while increasing network throughput. For example, the CSMA protocol involves potentially each node in the network trying to predict whether a collision will occur. When collisions are predicted, transmitters stop sending, wait an amount of time (e.g. a random amount of time), and then try to transmit again. As another example, the TDMA protocol is based on the allocation of unique time slots over a single frequency to access a network, thus reducing the possibility of interference. In the FDMA protocol, the given bandwidth is divided into smaller frequency bands, or subdivisions. Each subdivision has its own carrier frequency, and a control mechanism is used to ensure that two or more earth stations do not transmit in the same subdivision at the same time, and thereby designate a receiver for each subdivisions. The OFDM protocol divides the frequency spectrum into subbands small enough so that channel effects are constant (e.g. flat) over a given subband. Then, a modulation is sent over the subband. When properly implemented, the fast changing effects of the channel (e.g. multipath) disappear, as they are made to occur during the transmission of a single symbol and are thus are treated as flat with fading at the receiver.

Unfortunately, while these techniques were designed to compensate for certain problems with traditional forms of network communications, they still suffer several drawbacks. For example, the protocols generally send a single message in any given transmission. Any node for which the transmission is not intended that receives the message simply ignores it. This may result in wasted time, frequency, and/or bandwidth. Additionally, while these protocols were designed to reduce the contention problem and to increase throughput, still further improvements are desirable. Thus, it will be appreciated that there is a need in the art to provide systems and/or methods that further reduce contention problems and increase throughput by, for example, allowing simultaneous transmissions to multiple nodes within a network.

SUMMARY OF THE INVENTION

Certain exemplary embodiments provide a method of relaying messages over a communications network. A primary message and at least one secondary message to be communicated from a transmitter may be identified. The primary message may be designated for a first receiver node and the at least one secondary message may be designated for a second receiver node. The at least one secondary message may be piggybacked onto the primary message to form a piggybacked message in response to a signal indicating that piggybacking of the at least one secondary message onto the primary message is possible. The signal may be based at least in part on a characteristic of the first receiver node and the second receiver node relative to the transmitter node. The piggybacked message may be transmitted.

Certain other exemplary embodiments provide a method of relaying messages over a communications network. A transmitter node and at least two receiver nodes may be identified. A primary message and at least one secondary message to be transmitted from the transmitter node also may be identified, with each message being stored in a message queue, and each message including packets of data. A next packet of the primary message to be transmitted may be determined. Possible partner links between nodes in the network that are capable of supporting piggybacking for the next packet may be identified. A full message may be generated by piggybacking a packet of each of secondary message onto the next packet of the primary message in response to a signal indicating piggybacking is possible. The full message may be transmitted. The signal may be based at least in part on relative signal-to-noise ratios of the at least two receiver nodes with respect to the transmitter node.

According to certain exemplary embodiments, a system for relaying messages over a communications network may be provided. Such systems may include a transmitter node and at least two receiver nodes, with the transmitter node and the at least two receiver nodes being configured to communicate at least a primary message and at least one secondary message therebetween. The primary message and the at least one secondary message may be sent from the transmitter node to the at least two receiver nodes based at least in part on a comparison of signal-to-noise ratios of the at least two receiver nodes relative to the transmitter node. The primary message and the at least one secondary message may be piggybacked based at least in part on the comparison.

According to certain other exemplary embodiments, a system for relaying messages over a communications network may be provided. Such systems may comprise means for identifying a primary message and at least one secondary message to be communicated from a transmitter, the primary message being designated for a first receiver node and the at least one secondary message being designated for a second receiver node; means for piggybacking the at least one secondary message onto the primary message to form a piggybacked message in response to a signal indicating that piggybacking of the at least one secondary message onto the primary message is possible, the signal being based at least in part on a characteristic of the first receiver node and the second receiver node relative to the transmitter node; and, a transmitter configured to transmit the piggybacked message.

According to certain exemplary embodiments, a method of relaying messages over a communications network is provided. A first message to be communicated by a first antenna of a transmitter node and a secondary message to be communicated by a second antenna of the transmitter node may be identified. The first antenna and the second antenna may have substantially distinctive antenna apertures. The first message and the second message may be communicated substantially non-orthogonally at substantially the same time over substantially the same channel using the first antenna and the second antenna in dependence on a breakpoint difference between near and far field regions of the network.

According to certain exemplary embodiments, a system for relaying messages over a communications network is provided. A transmitter node may have two transmit antennas, with each transmit antenna having a distinct aperture. A receiver node may have two receive antennas, with each receive antenna having a distinct aperture corresponding to an antenna aperture of the transmit antennas. The transmitter node may be configured to transmit substantially non-orthogonally at substantially the same time over substantially the same channel a first message using a first antenna and the second message using a second antenna in dependence on a breakpoint difference between near and far field regions of the network.

Certain exemplary embodiments provide a method of relaying messages over a communications network. A primary message and at least one secondary message to be communicated from at least one transmitter may be identified. The primary message may be designated for one or more first receiver nodes and the at least one secondary message being designated for one or more second receiver nodes. The at least one secondary message may be piggybacked onto the primary message to form a substantially non-orthogonal piggybacked message such that the primary message and the at least one secondary message are capable of being transmitted at substantially the same time over substantially the same channel.

Certain exemplary embodiments provide a system for relaying messages over a communications network. Such systems may include a transmitter node and at least two receiver nodes. The transmitter node and the at least two receiver nodes may be configured to communicate at least a primary message and at least one secondary message therebetween. The primary message and the at least one secondary message may be piggybacked to form a substantially non-orthogonal piggybacked message, such that the primary message and the at least one secondary message are capable of being transmitted at substantially the same time over substantially the same channel.

In certain exemplary embodiments, an encoder for use with a transmitter node to prepare a message to be relayed through a network of nodes is provided. A piggybacking module may be configured to generate a piggybacked message by piggybacking at least one secondary message designated for at least one second receiver node onto a primary message designated for at least one first receiver node based at least in part on a comparison of signal-to-noise ratios of the receiver nodes relative to the transmitter node.

In certain other exemplary embodiments, an encoder for use with a transmitter node to prepare a message to be relayed over a communications network is provided. A piggybacking module may be configured to generate a piggybacked message by piggybacking at least one secondary message designated for at least one second receiver node onto a primary message designated for at least one first receiver node. The piggybacked message may be substantially non-orthogonal, such that the primary message and the at least one secondary message are capable of being transmitted at substantially the same time over substantially the same channel.

In certain exemplary embodiments, a decoder for use with a receiver node to process a message relayed through a network of nodes is provided. A separating module may be configured to separate a primary message designated for at least one first receiver node from at least one secondary message designated for at least one second receiver node based at least in part on a comparison of signal-to-noise ratios of the receiver nodes relative to the transmitter node. The primary message and the at least one secondary message may be included in a received piggybacked message.

In certain other exemplary embodiments, a decoder for use with a receiver node to process a message relayed over a communications network is provided. A separating module may be configured to separate a substantially non-orthogonal piggybacked message by separating at least one secondary message designated for at least one second receiver node from a primary message designated for at least one first receiver node.

Optionally, the decoders may further comprise a switch configured to control decoding and/or piggybacking, for example, to reduce the complexity and/or components of the module.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various exemplary embodiments of this invention. In such drawings:

FIG. 1a shows a scenario in which two receivers are located within the broadcast region of a transmitter;

FIG. 1b shows a scenario in which a receiver with a high SNR and a receiver with a low SNR are located within the broadcast region of a satellite;

FIG. 2 shows a scenario in which error-free decoding is possible even when a second transmitter using the same signal space as a first transmitter is introduced;

FIG. 3a shows one example of how non-orthogonal signaling may be used in conjunction with broadcast signaling;

FIG. 3b shows one example of how non-orthogonal signaling may be used in conjunction with full-duplex signaling;

FIG. 3c shows an illustrative division-free communication transceiver;

FIG. 8 shows a simple mesh network including three links between three nodes;

FIG. 9 shows the mathematically projected system capacity for the three node system depicted in FIG. 8, assuming that the nodes have equal transmit power;

FIG. 20a shows an illustrative transmitter that communicates using two antennas, each having a different aperture, in accordance with an exemplary embodiment;

FIG. 20b shows an illustrative receiver configured to communicate with the transmitter of FIG. 20a by using two antennas, in accordance with an exemplary embodiment; and, FIG. 21 shows illustrative rate curves for the two-user binary broadcast channel in accordance with an exemplary embodiment.

DETAILED DESCRIPTION OF ILLUSTRATED EMBODIMENTS

1. Motivation for Non-Orthogonal Communications Techniques

Figure 4:
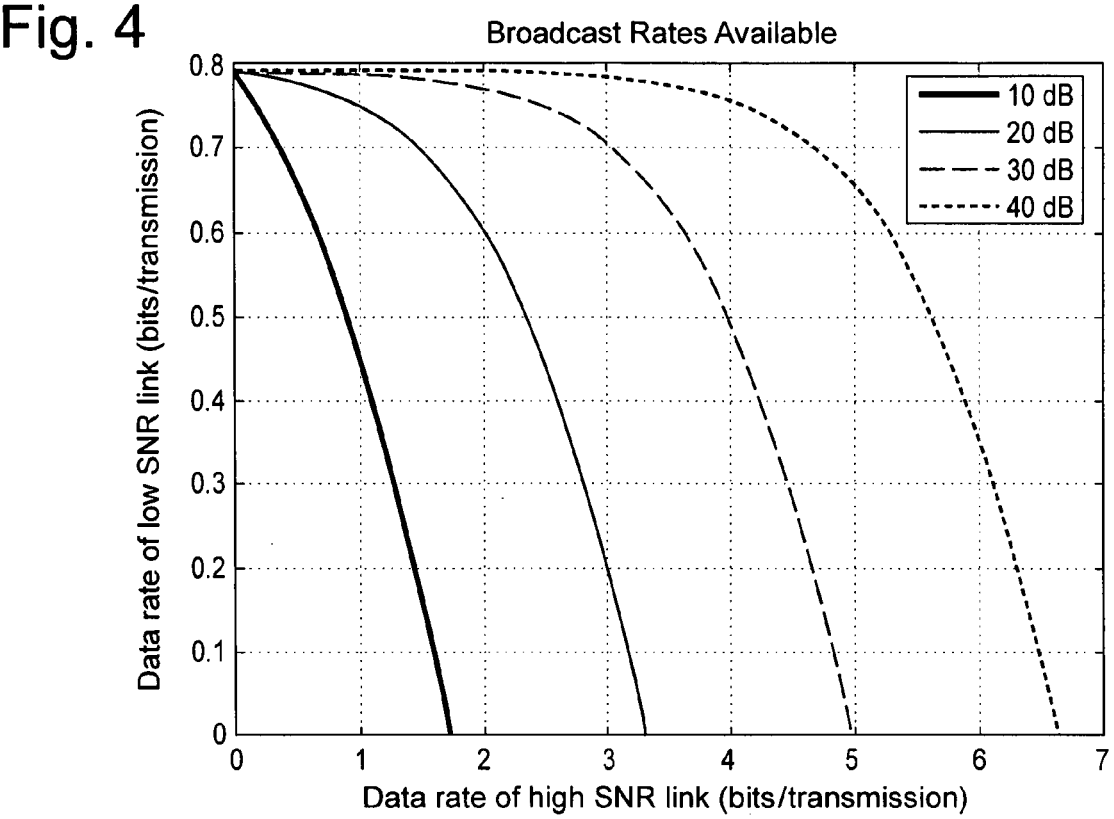
FIGS. 4 and 5 show mathematically projected broadcast rates available for low SNR links and high SNR links during an exemplary broadcast of an illustrative piggybacked message.

There are commonly found environments where non-orthogonal signals may be easily separated.

1.1 Examples where Non-Orthogonal Signals May be Separated

Channels with significant differences in received signal strength are potentially the most suitable. Referring again to FIG. 1a, it will be appreciated that the signal received by receiver R2 is likely to be significantly attenuated as compared to the signal received by receiver R1. There are many circumstances where significant path loss differences occur, such as, for example when a mobile satellite receiver operates at significantly lower signal-to-noise ratio (SNR) than the receiver of a fixed satellite terminal because of the smaller aperture of the mobile antenna, as shown in FIG. 1b. For example, fixed directional antennas with a diameter of less than about 1 foot offer more than about 20 dB gain at 5.7 GHz. A second example relates to the fact that a satellite terminal located at a beam edge receives less energy than a satellite receiver at a beam center. Third, foliage attenuation per meter increases with frequency, and received strengths may vary by more than 30 dB in just a few meters. Fourth, shadowing effects related to obstructions also significantly reduce received signal power. In multipath channels, a clear line-of-sight user may have a propagation path loss exponent of about 2 for example, whereas a non-line of sight channel may suffer a propagation path loss exponent of about 4 for example. It will be appreciated that significant path loss differences may occur under various other circumstances.

To maintain useful link performance between transmitter T3 and receiver R2, transmitter T3 must transmit enough RF energy to ensure reception by receiver R2, typically at less than about 1% bit error rate. Consider the signal transmitted from transmitter T3, intended for receiver R2, and received at R2. Because receiver R1 and receiver R2 are in the same broadcast region, receiver R1 could decode the transmission from transmitter T3 to receiver R2 without error. This is because the transmission from transmitter T3 to receiver R2 received by receiver R1 has a very high SNR. Even when a second transmitter T4 using the same signal space as transmitter T3 is introduced, error-free decoding of the transmission from transmitter T3 to receiver R2 received by R1 is still possible if the signal from transmitter T4 is weak relative to the signal from transmitter T3 signal. This scenario is reflected in FIG. 2.

Adding a weak signal in the RF broadcast region is the simplest way to achieve non-orthogonal communications. The weak signal information of this example is decoded according to the following steps, also described with reference to FIG. 2:

1. Receiver R1 receives an RF signal S. Signal S is the superposition (e.g. a sum) of a weak signal transmitted from transmitter T4, intended for receiver R1; an interfering strong signal transmitted from transmitter T3, intended for receiver R2; and noise.

2. Receiver R1 determines and duplicates the strong signal sent from transmitter T3 to receiver R2 received by receiver R1.

3. Receiver R1 subtracts the signal sent from transmitter T3 to receiver R2 received by receiver R1 from signal S, leaving the signal sent from transmitter T4 to receiver R1 received by receiver R1 and noise.

4. Receiver R1 decodes the information sent from transmitter T4 sent to receiver R1 received by receiver R1.

This process corresponds to multiple-user or multiple-access channel using non-orthogonal signaling. The channel becomes the broadcast channel when the signals from transmitters T4 and T3 are transmitted from the same point, as shown in FIG. 3a. Here, the weak and strong signal summation is controlled and synchronized. This simplifies signal detection.

Another class of links where non-orthogonal signaling is rarely considered is the full-duplex link, shown in FIG. 3b. Theoretically, it is possible to reuse the transmitted signal set for the reverse link. This may be achieved by subtracting the transmitted signal from the received signal. However, complete subtraction is difficult to implement. This is because there is distortion between the hardware transmit path and the self-interfering received signal that must be estimated. The dynamic range difference between the desired signal (e.g. the signal send from transmitter T4 to receiver R3), and self-interfering signal (e.g. the signal sent from transmitter T3 to receiver R3), is extreme. Nevertheless, a "division-free" communication transceiver designed by a team at the University of Bristol was successfully demonstrated. A reproduction of the transceiver is shown below in FIG. 3c. (See Chen, S., M. Beach, and J. McGeehan. "Division-free duplex for wireless applications." *Electronics Letters*, 34.2, January 1998: 22.)

1.2 Idealized Non-Orthogonal Multi-User Communications Theory 1.2.1 Idealized Broadcast Channels Information theory supporting non-orthogonal signaling was first presented by Cover. (See Cover, T. M. "Broadcast Channels." *IEEE Transactions on Information Theory*, vol. IT-18, January 1972: pp. 2-14.) The special case of the Gaussian broadcast channel with one transmitter and two receivers will now be outlined. (See Cover, T. M. "Broadcast Channels." *IEEE Transactions on Information Theory*, vol. IT-18, January 1972: pp. 2-14; Cover, T. M. "Comments on Broadcast Channels." IEEE Transactions on Information Theory, vol. IT-44, October 1998: pp. 2524-30; Cover, T. M. and J. A. Thomas. *Elements of Information Theory*. New York: John Wile & Sons, 1991.)

A capacity function may be defined as:

$$C(P/N) = \frac{1}{2}\log_2(1 + P/N),$$

which reflects the bits/signal dimension. In this equation, C is capacity, P is the signal power constraint, and N is noise. Thus, P/N is the signal-to-noise ratio. Cover's broadcast theorem states that the capacity region for the Gaussian broadcast channel, with signal power constraint P, is given by:

$$R_1 \leq C\left(\frac{\alpha P}{N_1}\right)$$
$$R_2 \leq C\left(\frac{(1-\alpha)P}{\alpha P + N_2}\right), \quad \text{for } 0 \leq \alpha \leq 1, \text{ for receivers } R_1 \text{ and } R_2.$$

Figure 5:
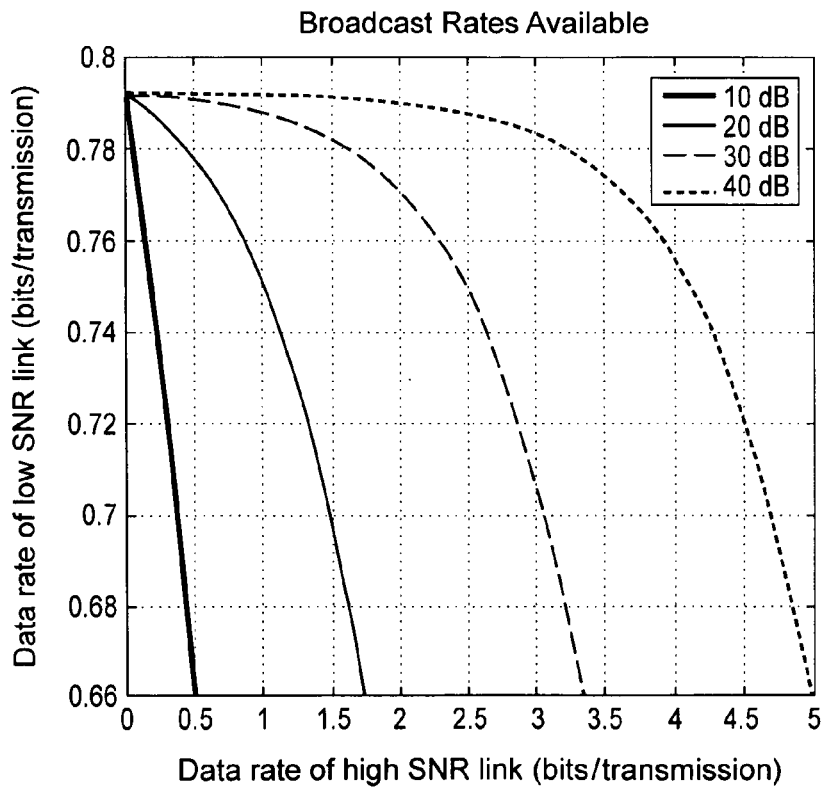

Examples of broadcast rates available with weak and strong channels are shown in FIGS. 4 and 5. A baseline received SNR of 3 dB was assumed for the weak path. In FIG. 5, the maximum percentage power allocation to the strong receiver is 10%. It is notable that a useful data rate may be allocated to the strong path receiver with almost no reduction to the weak path data rate. The envelope of rates available provides much flexibility for system design.

1.2.2 Idealized Multiple Access Channels

The multiple-access channel capacity boundary defines the maximum rates at which different users may transmit to a common receiver. The models are idealized, while multi-user reception over a free-space link practically is difficult. Multi-user reception over a multipath link is very difficult (if not impractical to implement in practice). The results show the limit of what can be achieved over a shared signal set.

The boundary for the two-user Gaussian multiple-access channel with received powers $P_1$ and $P_2$ is:

$$R_1 \leq C\left(\frac{P_1}{N}\right) = C_1$$
$$R_2 \leq C\left(\frac{P_2}{N}\right) = C_2,$$
$$R_1 + R_2 \leq C\left(\frac{P_1 + P_2}{N}\right).$$

The maximum combined rate of the Gaussian channel equals the capacity of the single user channel at the same total power. This envelope generally is ignored in wireless network design, as channels are assigned to single transmitter-receiver pairs. For example, if a channel is assigned to T-R pair 1, then the capacity rate pair is ($C_1$, 0), and the total information being transmitted in the channel is given by $R_1+R_2=C_1$.

The additional information transfer that could be supported by the channel (but is not being used) is:

$$C_{add} = C\left(\frac{P_1 + P_2}{N}\right) - C\left(\frac{P_1}{N}\right)$$
$$= \frac{1}{2}\log\left(1 + \frac{P_1 + P_2}{N}\right) - \frac{1}{2}\log\left(1 + \frac{P_1}{N}\right)$$
$$= \frac{1}{2}\log\left(1 + \frac{P_2}{N + P_1}\right)$$
$$= C\left(\frac{P_2}{N + P_1}\right)$$

Figure 6:
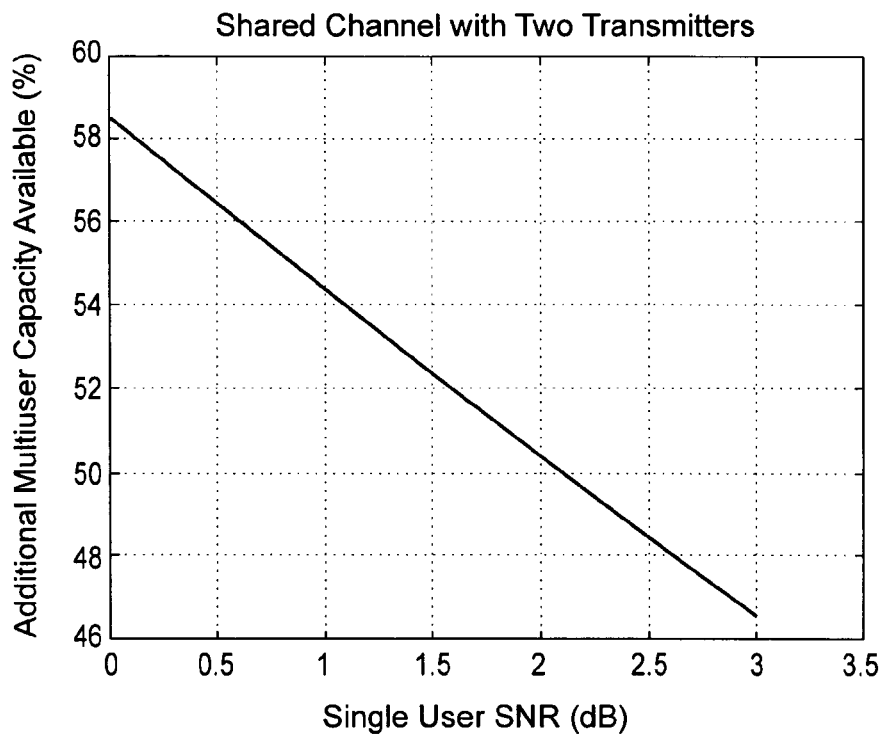
FIG. 6 shows the mathematically projected additional capacity available as a percentage of single user capacity for multiple access channel communication.

The additional capacity available as a percentage of the single user capacity is shown graphically in FIG. 6. The SNR range was chosen to match the typical operating region of turbo coded systems.

Figure 7:
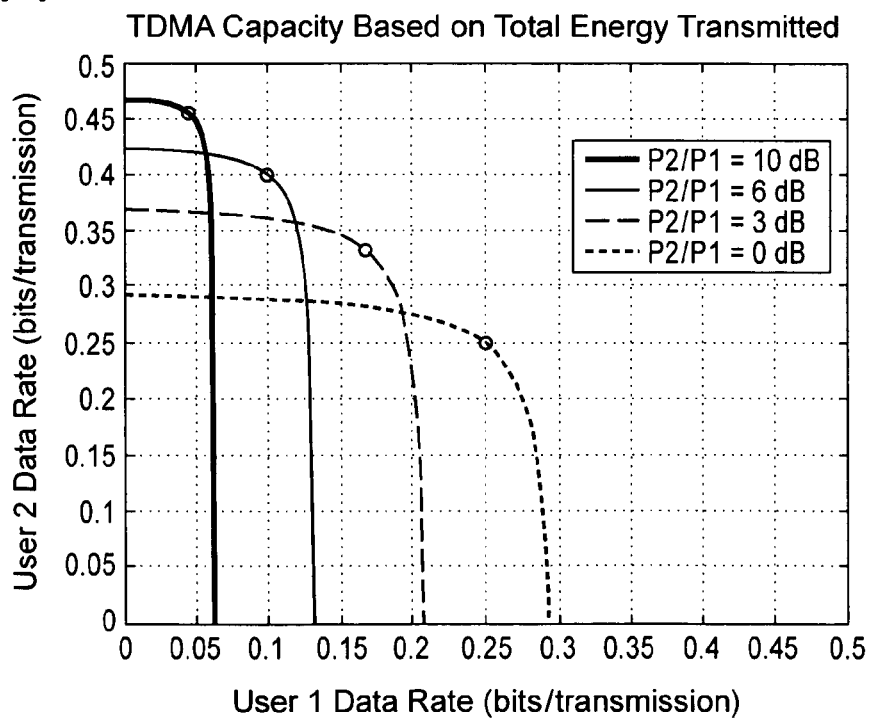
FIG. 7 shows capacity based on the total energy transmitted for TDMA-based multiple access channel communication.

The above results assume transmissions that are maximum-power limited. Alternatively, it may be more important to maximize throughput with respect to energy. To understand boundaries, a model where two transmit nodes have the ability to vary short-term power now will be described. In this case, a practical system may be TDMA with the desired signal reception limited in energy to $P_1T_1$ and $P_2T_2$, where $T_1+T_2=T$. The two-user rates achievable under this energy constraint are shown in FIG. 7. The circles locate the maximum total rate, found when the users' slot durations are allocated in proportion to the received power ($P_1/T_1=P_2/T_2$). Using TDMA, the multiple-access capacity boundary of Cover's theorem may be reached. Unfortunately, TDMA is optimal only under this condition.

A similar argument can be made for FDMA. Cover shows that proportional power sharing across bandwidth reaches the multiple-access boundary. Unfortunately, FDMA usually is considered less flexible than TDMA, although it does have the advantage of reducing peak transmission energy.

1.3 Topologies and Applications

The broadcast and multiple-access capacity regions most directly apply to star networks with continuous transmissions (e.g. satellite communications). This channel may be modeled as an Additive White Gaussian Noise (AWGN) channel. High altitude airships may have similar communications characteristics. These networks typically include different terminal configurations with different antenna gains located at various strengths in the beam pattern.

The results are not immediately applicable to packet-switching networks since queues, packet overhead, Automatic Repeat-reQuest (ARQ), and other aspects of the protocol are not modeled. Even knowing the received SNR requires some information transfer. However, the curves suggest the study of queuing systems that pair strong and weak channels. One proposed solution allocated an additional signal dimension to the strong user, inconsistent with the broadcast channel argument. Additional signal dimensions are not required for the second user. (See Jung, K., and J. M. Shea. "Simulcast Packet Transmission in Ad Hoc Networks." *IEEE Journal on Selected Areas in Communication*. vol. 23, March 2005: pp. 486-495.)

A much more complicated topology is the random mesh of ad-hoc networks. Researchers have made some attempts to develop information theoretic approaches to these networks. (See Hajek, B. and A. Ephremides. "Informaton Theory and Communication Networks: An Unconsummated Union." *IEEE Transactions on Information Theory*. 44.6, October 1998: pp. 2416-34; Liang-Liang, X. and P. R. Kumar. "A Network Information Theory of Wireless Communication: Scaling Laws and Optimal Operation." *IEEE Transactions on Information Theory*. 50.5, May 2004: pp. 748-67; Gupta, P. and P. R. Kumar. "Towards an Information Theory of Large Networks: An Achievable Rate Region." *IEEE Transactions on Information Theory*. 49.8, August 2003.)

One observation notes that multi-user signaling and reception is required to reach transport capacity in certain networks. A related fundamental issue is how to measure the performance of network protocols. For example, unsolved issues relate to whether transport capacity should be based on bit-meters to capture the desired features of a network, whether emphasis should be placed on distance instead of connectivity or throughput, and the measure that is both applicable in practice and also mathematically tractable. These fundamental questions associated with ad-hoc networks are far from being solved.

The simplest mesh has three nodes, as shown in FIG. 8. A plot of the total system capacity under different transceiver complexity models, assuming all nodes lie in a common broadcast region, is shown in FIG. 9 (described in further detail below). Total system capacity is the sum of all data transmitted on all links. Each node is allocated the same transmit power and receiver SNR. The idealized models are:

1) Time division system assuming only one link may be used at any time. The corresponding system capacity is:

$$C_{TD} = \frac{1}{2}\log_2(1 + P/N).$$

2) Time division with division-free duplex:

$$C_{TDDF} = 2C_{TD}.$$

3) The system capacity achieved when all links operate simultaneously with division-free duplex (by symmetry), $$C_{MDF} = 3*2*\frac{1}{2}\log_2(1 + P/(P+2N)).$$

4) The simultaneous link system capacity without division-free duplex, $$C_M = C_{MDF}/2.$$

The four equations are plotted in FIG. 9. They show that when received powers are equal, large capacity gains are available with division-free transmission, but only relatively small gains are available with multi-user broadcast and multiple-access signaling at low received SNR. At high SNR (not shown), there is no advantage to using multi-user strategies when the users have equal received SNR.

1.4 Link Distance vs. Capacity

When studying link distance versus capacity, two basic issues arise. The first relates to the maximum distance between a node and its nearest neighbor that allows a given reception rate. The second relates to the theoretical distance advantage with multi-user reception. The latter issue is posed, especially when considering mesh networks, cellular systems, and LEO satellite systems, for example.

Figure 10:
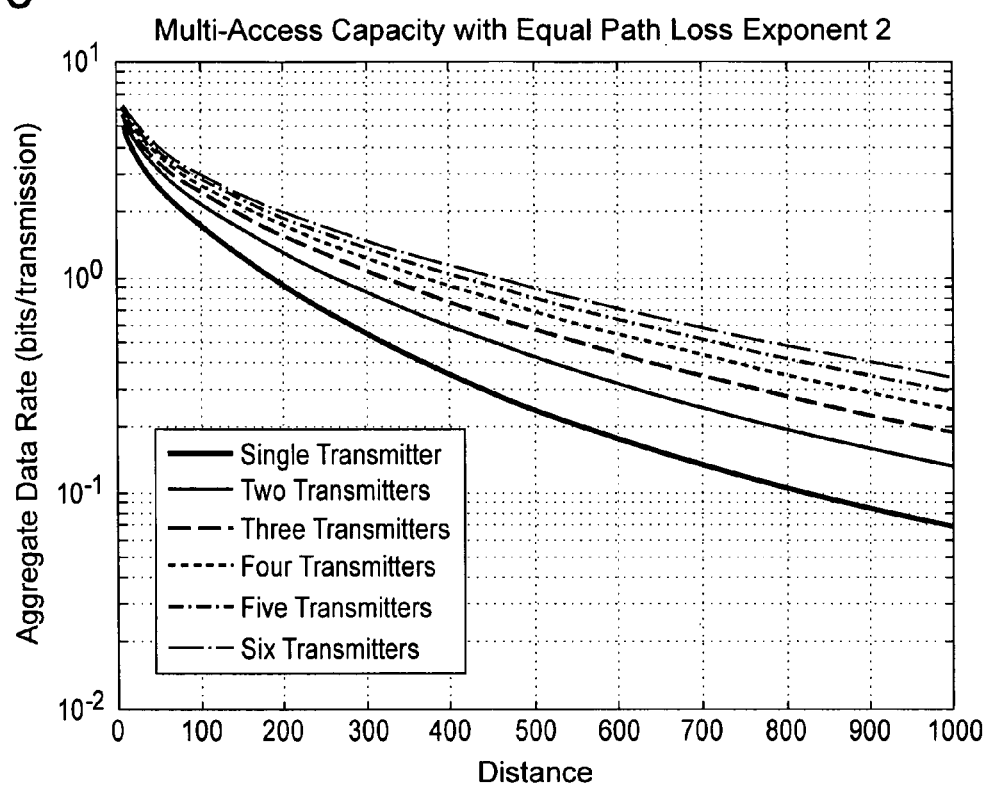
FIGS. 10 and 11 plot mathematically projected capacity versus distance for single- to six-user reception based on a simple path loss model with decay exponents 2 and 3, respectively.
Figure 11:
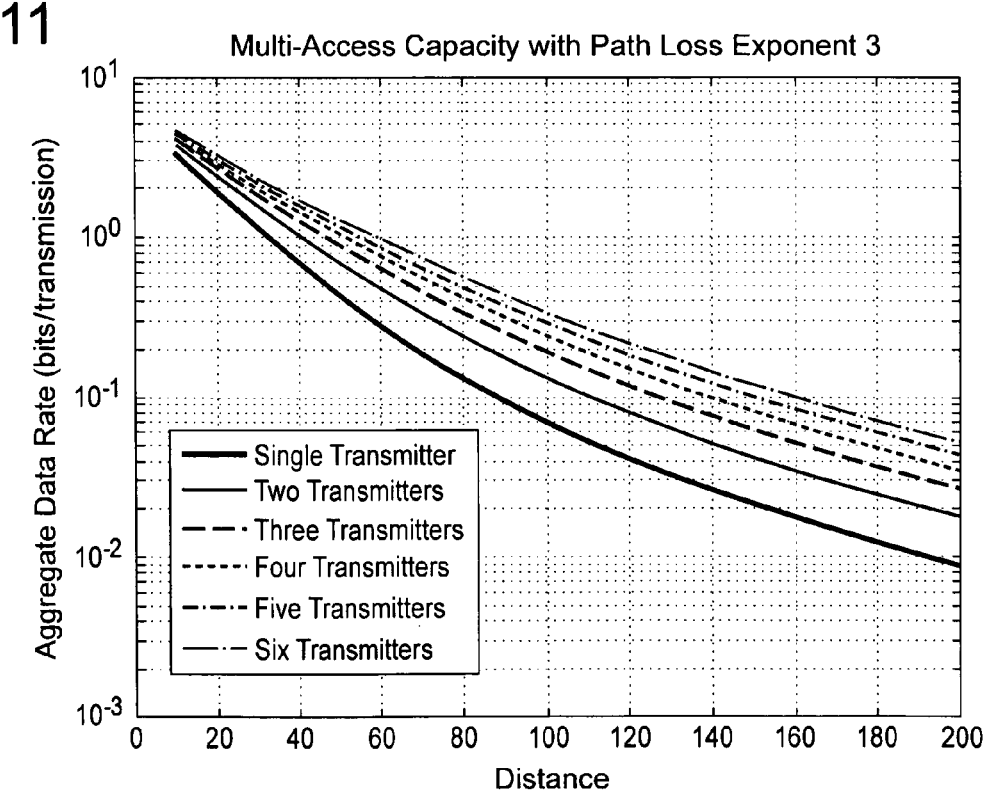

Capacity versus distance is plotted in FIG. 10, based on a simple path loss model with decay exponent two (free-space), for single- to six-user reception. FIG. 11 presents the same data with decay exponent three. There are different ways to interpret the results. On one hand, cooperative transmissions can significantly extend the distance between neighbors in a network. On the other hand, considering a satellite system, lower orbits allow significantly fewer satellites to deliver a given reception rate.

1.5 Piggyback System Solution

Given the above results, multi-user broadcast signaling may be suitable to environments with large received signal power differences. The mutual broadcast area may be divided into two link sets—e.g., one that supports less capable transmissions, and the other supporting more capable transmissions. Piggybacking as defined herein refers to the two or more messages being sent simultaneously on the same channel, or on the same time-frequency-bandwidth scale (e.g. transmitter A may send a first message for receiver B and a second message for receiver C, with both messages included within a single message and sent to both receivers at the same time). In certain non-limiting implementations, Piggyback Communications capabilities may be more finely determined by examining the SNR differences between each pair of links between nodes in the network.

2. Exemplary Piggyback Techniques

Certain illustrative modules for implementing piggybacking techniques will now be described. Of course, the following descriptions are provided by way of example and without limitation. It will be appreciated that such modules may be stored on and executed by the nodes comprising a network, by other mechanisms associated with nodes in the network, or the like. It also will be appreciated that the modules may be implemented as software, hardware, firmware, or some combination therebetween. Also, various encoders and decoders are described in relation to the illustrative modules. It will be appreciated that any encoding/decoding protocol may be used, alone or in combination, with the exemplary embodiments disclosed herein. Thus, certain exemplary embodiments may implement, for example, network coding, layered coding, turbo-coding, etc.

2.1 Exemplary Techniques for Piggybacking One Weak Signal on a Strong Signal

In conventional broadcasting, the same data is sent to all users in the broadcast region. Accordingly, transmission power must be substantially continually strong enough to reach even the weakest receiver. This presents a favorable situation for piggyback networks. For example, as the difference between the weakest and strongest receiver increases, it becomes possible to add independent information signals (e.g. a third signal) to the transmission. The additional receiver's SNR would need to be in a decibel range in the middle of the strong and weak receivers. This may enable more flexibility for setting the power of the third (fourth, etc.) user as the difference between the strong SNR and weak SNR grows.

For example, an approximately 40 dB signal difference between the strong and weak receivers may be reasonable to squeeze in a second piggyback transmission (e.g. a third signal), thus resulting in an arrangement roughly equivalent to a tricast. However, more broadly, this process may be generalized in certain exemplary embodiments (e.g. via software in certain exemplary embodiments where conditions are favorable) to add additional signals (e.g. as described below).

Figure 12:
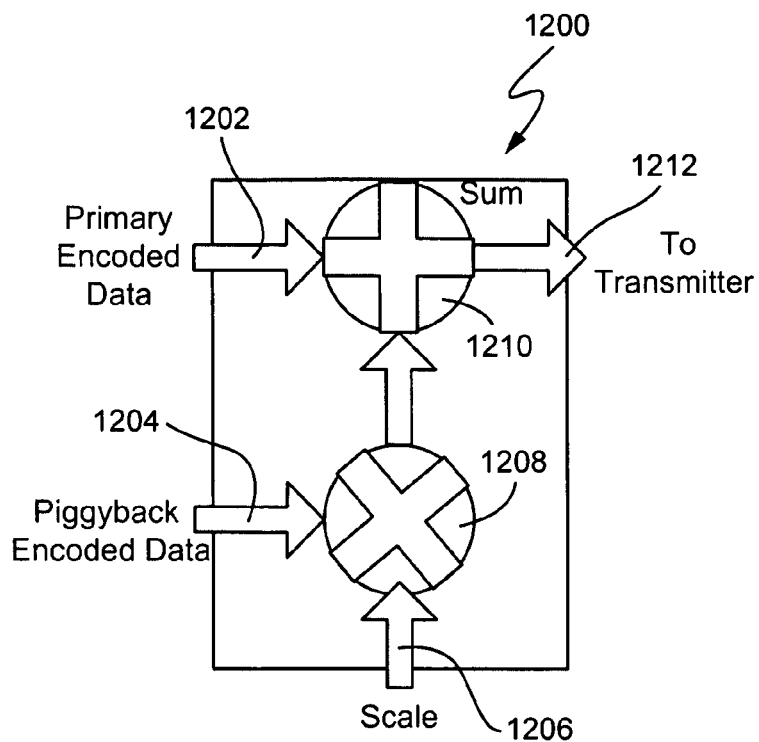
FIG. 12 is an illustrative block diagram of a piggyback encoding module in accordance with a first exemplary embodiment.

FIG. 12 is an illustrative block diagram of a piggyback encoding module 1200 in accordance with an exemplary embodiment. Primary encoded data 1202 and piggyback encoded data 1204 are inputted into the module 1200. The piggyback encoded data 1204 is scaled by a scale factor 1206 by scaler 1208 so as to be weaker than primary encoded data 1202. It will be appreciated that any number of scale factors may be used. For example, a scale factor reducing the relative signal strengths to a ratio of about 100:1 generally will suffice; however, such a large-scale reduction may not be necessary in all implementations. In certain exemplary embodiments, the actual loss may be known and data may be scaled accordingly. In certain other exemplary embodiments, the loss may be estimated (e.g. by assuming a $1/r^2$ vs. $1/r^3$ dropoff in signal strength, etc.). The output from scaler 1208 and primary encoded data 1202 may be summed by summer 1210, and the processed output 1212 thereof may be sent to the transmitter of the node.

Figure 13:
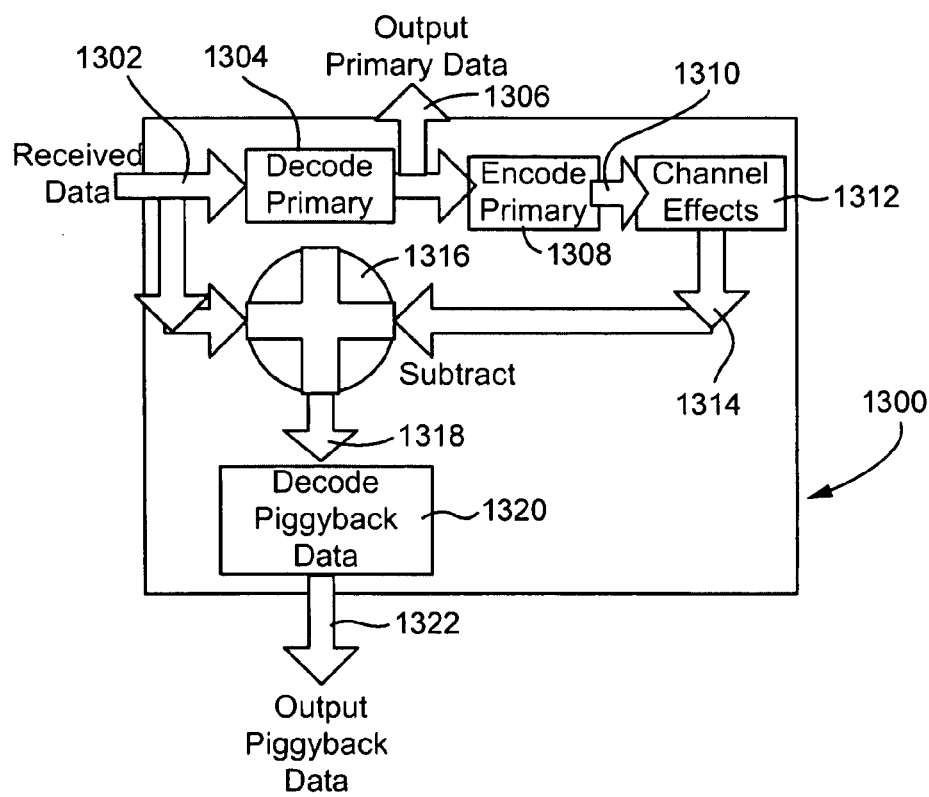
FIG. 13 is an illustrative block diagram of a piggyback decoding module in accordance with another exemplary embodiment.

FIG. 13 is an illustrative block diagram of a piggyback decoding module 1300 in accordance with an exemplary embodiment. Once a node receives a message encoded by piggyback encoder 1200, received data 1302 may be processed. First, primary data decoder 1304 may decode and output the original primary data 1306. The encoded piggyback data may be retrieved by subtracting the simulated transmission of primary data from received data 1302.

To simulate the transmission of primary data, original primary data 1306 is encoded by primary encoder 1308, and channel effects 1312 are combined with the resulting encoded primary data 1310. Thus, simulated data 1314 is obtained, and it may be subtracted from received data 1302 by subtracter 1316. Because the process of decoding the primary data and simulating the encoding of primary data requires at least some processing lead time, it may be necessary to store received data 1302 (e.g. in a memory or the like) until simulated data 1314 is ready for subtracter 1316. Alternatively or in addition, one or more buffers may be used instead of a memory. In general, any delay mechanism may be used to delay subtracter 1316 from processing received data 1302 before simulated data 1314 is obtained.

The subtracted output represents encoded piggyback data 1318, which may be decoded by piggyback data decoder 1320 (e.g. to compensate for scaling, channel effects, etc.). Ultimately, piggyback data 1322 may be output.

2.2 Exemplary Techniques for Piggybacking Two Weak Signals on a Strong Signal

Figure 14:
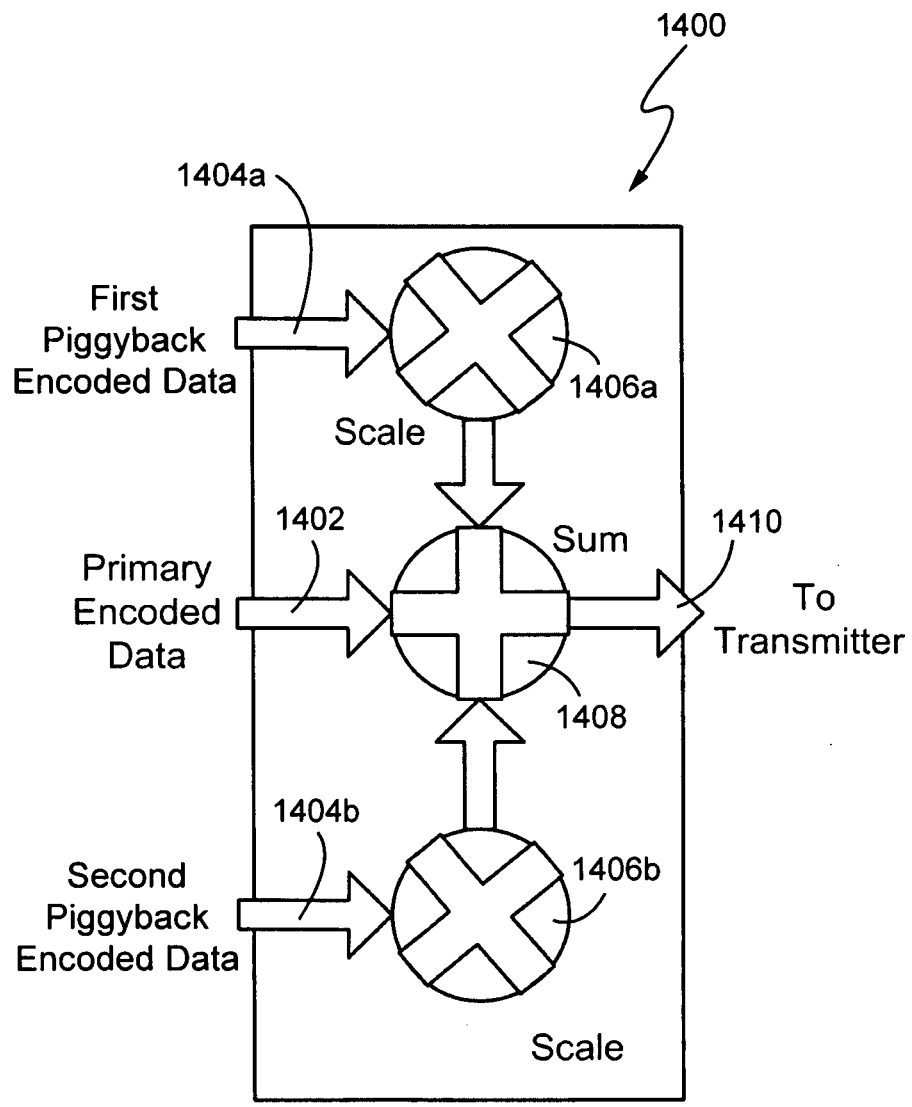
FIG. 14 is an illustrative block diagram of a piggyback encoding module for encoding three data streams in accordance with yet another exemplary embodiment.

FIG. 14 is an illustrative block diagram of a piggyback encoding module 1400 for encoding three data streams in accordance with an exemplary embodiment. Primary encoded data 1402 and first and second piggyback encoded data 1404a-b are inputted into the module 1400. The first and second piggyback encoded data 1404a-b is scaled by respective scale factors by scalers 1406a-b so as to both be weaker than primary encoded data 1402. Summer 1408 sums primary encoded data 1402, and first and second piggyback encoded data 1404a-b. The processed output 1410 thereof may be sent to the transmitter of the node.

Figure 15:
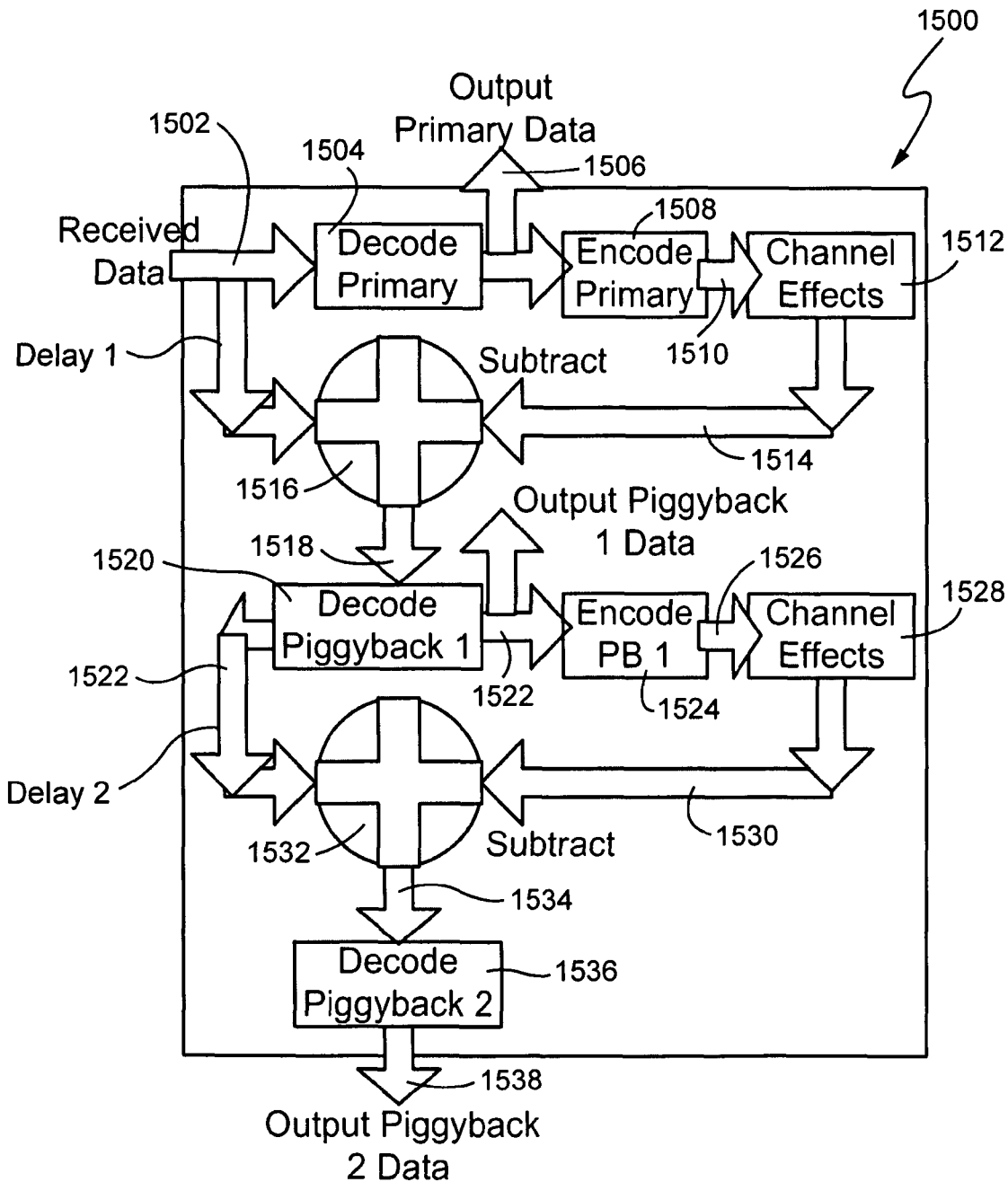
FIG. 15 is an illustrative block diagram of a piggyback decoding module for decoding three data streams in accordance with still another exemplary embodiment.

FIG. 15 is an illustrative block diagram of a piggyback decoding module 1500 for decoding three data streams in accordance with an exemplary embodiment. Once a node receives a message encoded by piggyback encoder 1400, received data 1502 may be processed. First, primary data decoder 1504 may decode and output the original primary data 1506. The encoded first piggyback data may be retrieved by subtracting the simulated transmission of primary data from received data 1502.

To simulate the transmission of primary data, original primary data 1506 is encoded by primary encoder 1508, and channel effects 1512 are combined with the resulting encoded primary data 1510. Thus, simulated primary data 1514 is obtained, and it may be subtracted from received data 1502 by first subtracter 1516. As above, it may be necessary to implement a delay mechanism before first subtracter 1516 processes received data 1502. The subtracted output represents encoded first and second piggyback data 1518.

The process essentially repeats itself to extract the two piggyback data streams from what is left of the message. Thus, first piggyback data decoder 1520 decodes encoded first and second piggyback data 1518. First piggyback data 1522 may be output at this point. The transmission of encoded first piggyback data 1522 needs to be simulated so that it can be subtracted from encoded first and second piggyback data 1518 to ultimately yield second piggyback data. Thus, first piggyback data 1522 is encoded by first piggyback encoder 1524, and channel effects 1528 are introduced into the resulting encoded first piggyback data 1526. The simulated encoded first piggyback data 1530 then may be subtracted from encoded first and second piggyback data 1522 by subtracter 1532. Again, it may be necessary to implement a second delay mechanism before second subtracter 1532 processes first piggyback data 1522. The resulting encoded second piggyback data 1534 may be decoded by second piggyback data decoder 1536. Second piggyback data 1538 then may be outputted.

Figure 16:
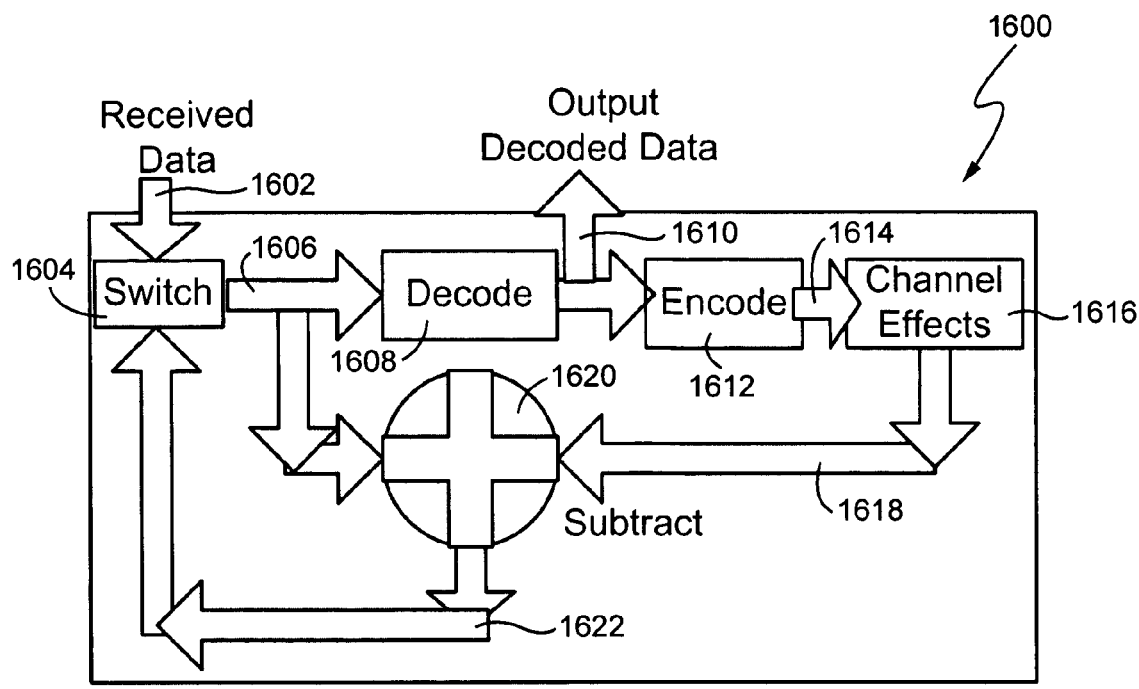
FIG. 16 is a single-multiple piggyback decoder that implements a switch in accordance with an exemplary embodiment.

2.2 Exemplary Generalized Techniques for Piggybacking Weak Signals on Strong Signals It will be appreciated that the techniques described above may be used for additional data streams (e.g. by adding encoding and decoding branches or loops). Yet, these techniques may become cumbersome as additional data streams are introduced into messages, especially for decoder modules. Thus, certain exemplary embodiments may advantageously collapse the branches to provide an illustrative single-multiple piggyback decoder. For example, one exemplary technique to generalize the process and accommodate one or more streams relates to implementing a switch in a decoder. FIG. 16 is a single-multiple piggyback decoder 1600 that implements a switch in accordance with an exemplary embodiment.

In the illustrative module shown in FIG. 16, received data 1602 is inputted into the module to switch 1604. Switch 1604 may control which data should be decoded (e.g. how far along the decoding process is). It may accomplish this, for example, by using one or more parity bits embedded in the stream, by keeping a simple count, etc. The data stream may be relayed from the switch 1604 to the decoder 1608, which may use switch information 1606 to instruct decoder 1608 which stream should be decoded. The decoder 1608 may output decoded data 1610. To simulate the transmission to be subtracted from the stream, decoded data 1610 may be encoded by encoder 1612, and channel effects 1616 may be applied to the encoded data 1614. The simulated stream 1618 may be subtracted from the original data stream 1602 by subtracter 1620 as signaled by switch data 1606. The subtracted output 1622 now functions as the original received data 1602 and is fed into switch 1604. Switch 1604 may be updated at this time (e.g. a counter may be incremented, one or more parity bits may change, etc.). The process then may be repeated any number of times appropriate to the number of streams piggybacked on the primary stream. It will be appreciated that the last time through the loop, the subtracted output 1622 may be outputted directly (not shown) without having to go through the switch again. Alternatively, or in addition, the data may go through the switch, but switch data 1606 may instruct decoder 1608 that there is nothing to decode and the data may be outputted as decoded data 1610, with the process stopping at encoder 1612 or after (e.g. because there is no data left to encode and subtract, etc.).

Figure 17:
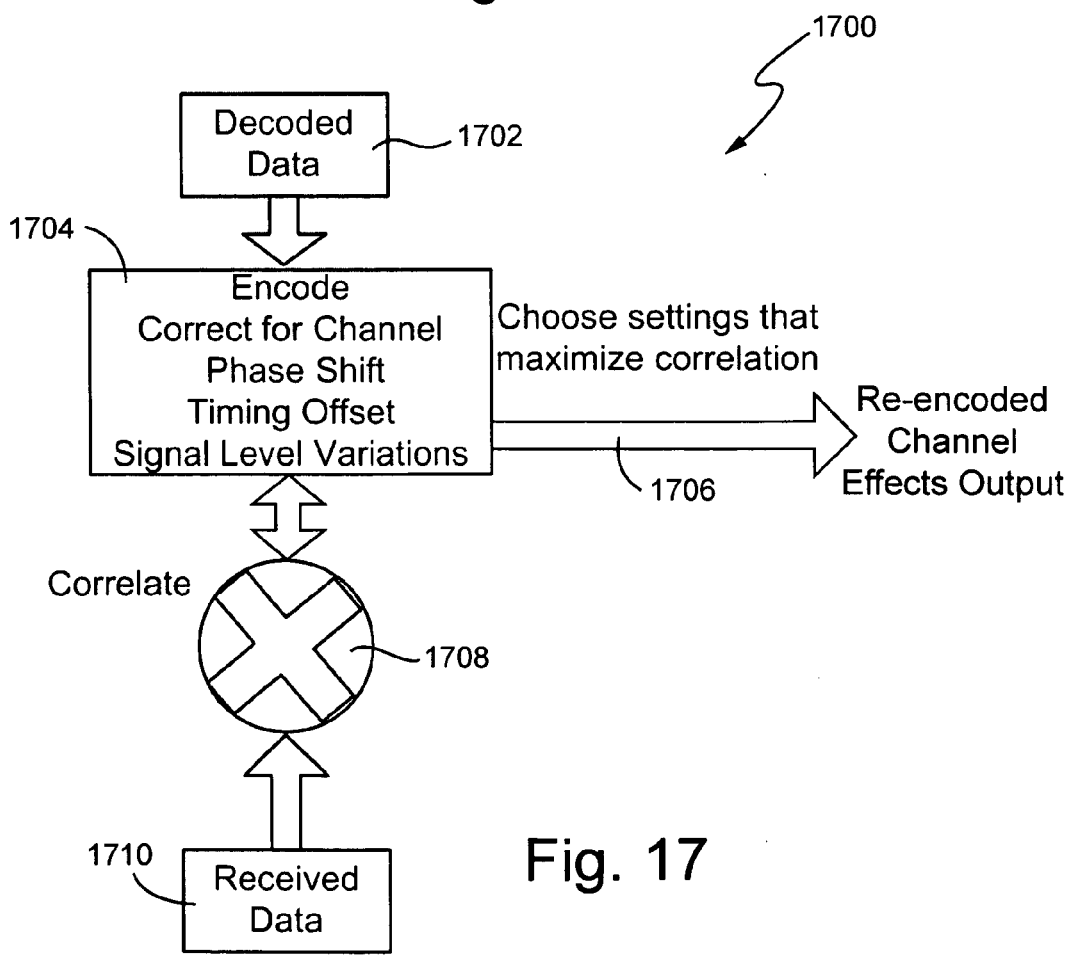
FIG. 17 is an illustrative mechanism for providing an estimate of the signal that would be received if only primary data was transmitted.

FIG. 17 is an illustrative mechanism for providing an estimate of the signal that would be received if only primary data was transmitted. Differently stated, this process may comprise an optional additional step of computing a best fit match between the received signal and an original coded stream, which may be performed to improve synchronization parameters that are needed when for decoding encoded messages. Output 1706 in FIG. 17 corresponds to simulated stream 1618 in FIG. 16. Between the transmitter and the receiver, various channel effects serve to distort the transmitted signal before it is received. These include attenuation related to free space loss and shadowing, carrier phase and symbol timing ambiguities and drifts, specular and multi-path fading, hardware distortions, etc. The decoded data 1702 is input into the channel effects block 1704 and re-encoded, generating an idealized copy of the transmitted signal. The channel effects estimator attempts to measure some or all of these effects and modifies the idealized copy of the transmitted signal, which it outputs as re-encoded channel effects output 1706. The correlation block 1708 is used to measure the quality of the channel effects estimator. Higher correlation indicates that the channel effects parameters are measured to a greater fidelity. The correlation block outputs a correlation signal or a correlation metric, which is fed back to the channel effects estimator. In some cases, performing operations, such as, for example, differentiation on the correlation output, may be used as an error signal to improve the quality of the channel effects estimator.

3. Exemplary Techniques for Piggybacking Data through a Network

3.1 Illustrative Transmissions between Nodes

As noted above, it typically is considered a problem that nodes that are far away from a transmitter have weak signals with respect thereto (e.g. the nodes that are far away from a transmitter have lower SNR compared to nodes that are closer to a transmitter). For at least this reason, conventional communications transmit only a single message at a time, with any nodes within the receiving region ignoring inappropriate messages. However, the exemplary embodiments herein may use this feature as a technical advantage, allowing, for example, for simultaneous transfer of data to one or more near and one or more far nodes substantially simultaneously. Thus, it will be appreciated that certain exemplary embodiments disclosed herein may allow for the reuse of bandwidth, providing advantages roughly analogous to those associated with frequency reuse techniques. For example, it may be possible to achieve the substantial double-use of bandwidth when certain exemplary embodiments are implemented to communicate a message to one near node and one far node. Certain exemplary embodiments therefore may be thought of as filtering communications based on distance (e.g. as inferred by respective SNRs). It will be appreciated that communications sent/received according to certain illustrative techniques described below may reduce the above-noted contention problem and increase network throughput by allowing simultaneous transmission to multiple nodes that have large differences in received SNR. One approach having a reduced impact on routing follows.

3.1.1 Exemplary Techniques for Sending Messages

Figure 18:
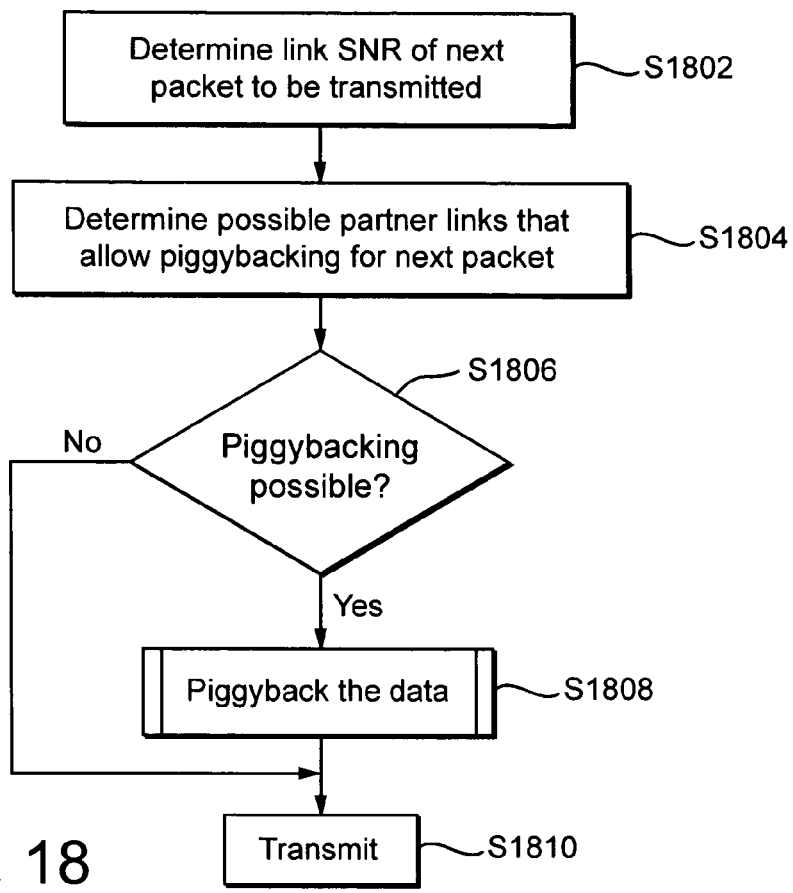
FIG. 18 is an illustrative flowchart illustrating how data may be piggybacked through a network in accordance with an exemplary embodiment.

FIG. 18 is an illustrative flowchart illustrating how data may be piggybacked through a network in accordance with an exemplary embodiment. In step S1802, the link SNR of the next packet to be transmitted is determined. Then, possible partner links that allow piggybacking for the next packet are determined in step S1804. If it is determined that piggybacking is possible in step S1806, the data is piggybacked in step S1808 and transmitted in step S1810. However, if it is determined that piggybacking is not possible in step S1806, the data is not piggybacked and is transmitted conventionally in step S1810. It will be appreciated that this process may be looped in certain exemplary embodiments that serially piggyback and transmit more than simply a primary message and a secondary message.

This process assumes that a list of link SNR estimates are available at each node. In a static network, link SNRs may be known beforehand. However, in another situation (e.g. in which a dynamic network is provided), link SNRs may need to be estimated on-the-fly (e.g. as messages pass from one node to the next, as they are about to pass from one node to the next, etc.). Available per link data rate estimates (including, for example, data rate increase related to piggyback channels) may be supplied to the routing, network, and topology management protocols. One example of topology optimization that is possible with certain exemplary embodiments is that systems can be partitioned to optimize based on capacity and fewer number of hops to span the network. This may be accomplished by arranging antenna pattern beams (e.g. the broadcast region of a directional antenna) to include the appropriate near and far communicating nodes in each set. It will be appreciated that multiple links may be within a beam (e.g. a near link and a far link). As another example, in a cellular network, a node may provide substantially constant feedback to other nodes, and a link SNR may be adduced based on this information. In a further example, power control may provide a mechanism for estimating SNR, similar to CDMA protocol implementations. In cases where this information may not be available, data may be piggybacked anyway (and exceptions may be handled at the receiver or later within the network). Alternatively or in addition, the data may be sent in a conventional manner.

Figure 19:
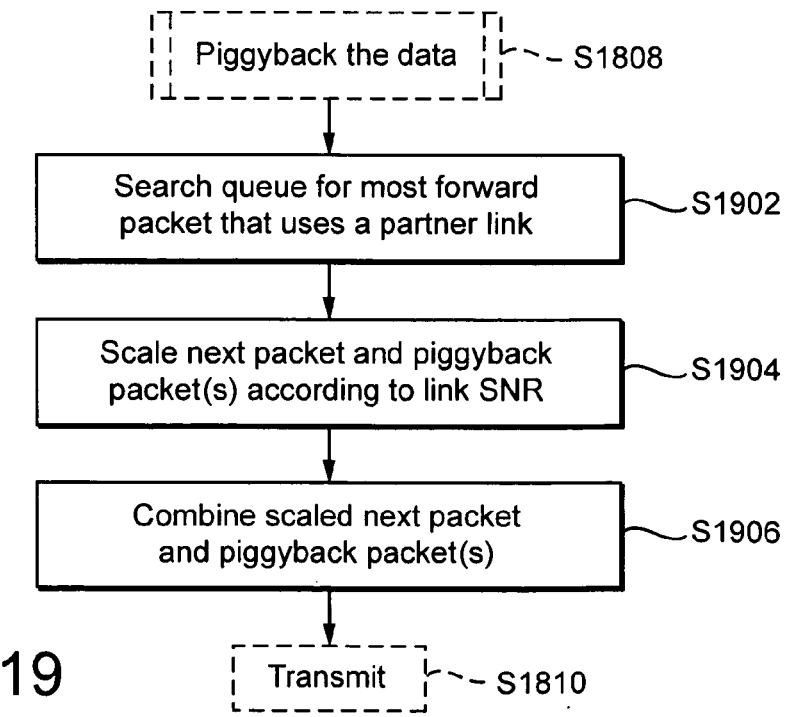
FIG. 19 is an a detailed view of how data may be piggybacked in accordance with an exemplary embodiment.

FIG. 19 is a detailed view of how data may be piggybacked in accordance with an exemplary embodiment. FIG. 19 shows an illustrative step S1808 in greater detail. In particular, the queue of packets at each node may be searched for the most forward packet that uses a partner link, as in step S1902. More generically speaking, however, the data are queued according to the piggyback link sets that are either known, estimated, or the like, as described above. The partner links are the links that are associated with the primary data and secondary data. For example, if primary data is transmitted from A to B and secondary data is transmitted to C, then transmissions A→C and A→B would be partner links. The resulting packet may be denoted the piggyback packet. The selection criteria used to choose the next packet optionally could be applied to the partner. For example, if the same mechanism that selects the next packet from the queue may also select the piggyback packet from the possible partner list. By estimating link SNRs and matching queues to potential piggyback channels, delay may be reduced and throughput may be increased in a communication network.

The next packet and/or the piggyback packet(s) may be scaled according to link SNR in step S1904. The scaling may depend on, for example, the relative SNRs of the two links. It will be appreciated that the optimal weighting may be determined experimentally, as operating parameters of the network (e.g. bit error rate, packet error rate, etc.) may suggest various weighting factors. The next packet and the piggyback packet(s) may be combined in step S1906. Thus, the combined packet will be ready for transmission in step S1810. Again, it will be appreciated that this process may be looped in certain exemplary embodiments to accommodate multiple-message piggybacking beyond a primary message and a second message.

As an illustration of the process depicted in FIG. 19, assume a system in which there are five links in the broadcast region. Four links are evaluated as possible partner links. The criteria may be that the partner link has a received SNR 20 dB higher than the receiver of next packed. Assume further that two links satisfy the criteria. The queue then may be searched for the most forward packet that uses one of those links. Computational enhancements (such as, for example, predetermining link partners and the use of content addressable memory, and the like) may be used to speed the search. Of course, it will be appreciated that this example is provided by way of illustration and without limitation.

Link set information may be leveraged in various ways in addition to, or apart from, the above-described techniques. For example, suppose two packets are scheduled from source A to destination C. If A can reach C directly, the network may choose to use the A to C link twice. Now suppose that A to B is a partner link of A to C. In this case, A being transmitted to C by way of B (e.g. A to B, followed by B to C) is a possible method of delivering the two packets. Implementing network algorithms (e.g. network routing algorithms) to take advantage of this arrangement may have network resource benefits such as reduced delay, increased throughput, etc.

3.1.2 Exemplary Techniques for Receiving Messages

Correspondingly, receivers having low SNR may perform normal decoding, whereas receivers with higher SNR may perform piggyback decoding when there is the possibility that a piggyback link has been assigned to them. According to certain exemplary embodiments, bits in the data streams may be used to identify the intended receiver(s) (e.g. addressing bits). It will be appreciated that the number of bits required for addressing may depend on, for example, the number of nodes in a network, the number of nodes to which a message may be sent simultaneously, etc.

A basic simulation employing turbo codes was created to verify that piggyback packets are separable. In this illustrative simulation, each transmitted block included a primary codeword added to a secondary codeword that was scaled by the channel strength difference. No performance degradation was seen at 20 dB and 30 dB relative channel strength differences, while 0.6 dB Eb/No loss was observed with the weaker receiver at 10 dB power difference. Analog-digital conversion and other exemplary implementation aspects were not modeled, though it will be appreciated that certain exemplary embodiments could be implemented to accommodate such aspects.

3.2 Illustrative Hardware and/or Software Modifications

Certain exemplary embodiments are well-suited for applications where one transmitter node has a directional antenna and where one or more receiver nodes have omni-directional antennas associated therewith. Thus, the distances between the transmitter and the receivers vary based on distance producing the SNR arrangement certain exemplary embodiments may leverage to enable faster transmissions. Communication from omni-directional antenna to omni-directional antenna also may produce similar arrangements. Such arrangements may be found, for example, in satellite networks, cellular networks, networks where PDAs communicate with a server, etc.

A further arrangement where piggyback communications may be implemented relates to using two distinct antenna apertures at the same location. For example, FIGS. 20a-b refer to yet another variation, in which transmitters and receivers both include two antennas, with each transmitter antenna having a different aperture. In particular, FIG. 20a shows an illustrative transmitter that communicates using two antennas, each having a different aperture, in accordance with an exemplary embodiment, and FIG. 20b shows an illustrative receiver configured to communicate with the transmitter of FIG. 20a by using two antennas, in accordance with an exemplary embodiment. According to these exemplary embodiments, transmission of the two messages may take place on the same frequency with the same modulation, but with two different antenna apertures. The transmitter 2000 may transmit one message via antenna aperture A 2002 and the other on antenna aperture B 2004. Because the near field/far field transition is at approximately $2D^2/\lambda$ (where D is the maximum dimension of the antenna aperture and $\lambda$ is the wavelength), by providing antenna apertures A 2002 and B 2004 with different maximum dimensions, the near/far breakpoints will be different for the two transmissions. As a result a receiver 2010 having two receiving antennas 2012 and 2014, separated by a distance d along a line pointing toward the transmitter, can completely eliminate the transmission from either transmitter antenna aperture A 2002 or transmitter antenna aperture B 2004 by appropriately weighting the output of receiving antenna 2012 by scaler 2016 (e.g. by a factor of $-\alpha$) when it is added in the summer 2018 to the output of receiving antenna 2014 (when $\alpha$ is appropriately set).

By appropriately adjusting the far-field breakpoints and transmit powers, this two aperture-based communications embodiment also may be made to function so that the most distant receiver will not receive any appreciable interference from the transmission to the less distant receiver and therefore the most distant receiver will not need to use a two antenna aperture and weighted combiner. For example, one antenna may primarily radiate a communications signal with a field that drops off, for example, at approximately $1/r^2$, and the other primarily antenna may primarily radiate a communications signal with a field that drops off, for example, at approximately $1/r^3$. A receiver that is relatively distant may not be influenced by the radiation that drops off at approximately $1/r^3$. Alternatively or in addition, a receiver close to the transmitter may enhance the SNR of the approximately $1/r^3$ signal by using a differential antenna.

Further optional modifications may include using a finite word-length, stretchable words, infinite words (or simulated infinite word-length), etc. Analog-digital resolution also may be implemented in certain exemplary embodiments. Also, certain exemplary embodiments may take into account the impact on SNR error rates on performance (e.g. by estimating SNR and sending redundant data accordingly, etc.).

While the above-described exemplary embodiments have been described in relation to access to the physical layer (e.g. using SNR), the invention is not so limited. For example, certain exemplary embodiments may take advantage of significant differences in link performance with reference to the link bit error rate and/or packet error rate to determine joint transmission rates. Illustrative rate curves for the two-user binary broadcast channel in accordance with an exemplary embodiment are shown in FIG. 21, with User 1 operating at 10E-6 BER. (See Cover, T. M. and J. A. Thomas. *Elements of Information Theory*. New York: John Wile & Sons, 1991.) The poorly performing link of User 2 was selected to reflect a range of BER that may occur in a mobile satellite channel. The curves show the advantage of broadcast coding over time-division multiplexing (TDM). For example, when the weak channel is at 20% BER, TDM allows User 1 to operate at 0.14 bits/transmission when User 2 requires 0.24 bits/transmission, whereas a joint rate of (0.21, 0.24) is available with broadcast coding. Satellite channel fading is correlated over time and is not modeled in the curves. Also, other techniques, such as multicast, may be used in combination with, or in place of, certain techniques described herein.

Also, while the exemplary embodiments herein have been described in large part relating to wireless communications, the invention is not so limited. For example, some techniques may be applied to wired systems, such as, for example, those using shared communications busses.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention. Also, the various embodiments described above may be implemented in conjunction with other embodiments, e.g., aspects of one embodiment may be combined with aspects of another embodiment to realize yet other embodiments.

What is claimed is:

1. A method of relaying messages over a communications network, the method comprising:
   identifying a primary message and at least one secondary message to be communicated from a transmitter, the primary message being designated for a first receiver node and the at least one secondary message being designated for a second receiver node that is geographically separated from the first receiver node;
   piggybacking the at least one secondary message onto the primary message to form a piggybacked message in response to a signal indicating that piggybacking of the at least one secondary message onto the primary message is possible, the signal being based at least in part on a characteristic of the first receiver node and the second receiver node relative to the transmitter node; and,
   transmitting the primary message and the piggybacked message at a same power level, wherein the piggybacking is further practiced by:
   scaling the at least one secondary message by a scale factor to form a scaled message; and,
   summing the primary message and the scaled message.

2. The method of claim 1, further comprising maintaining a list storing the characteristic corresponding to each link between the nodes in the network.

3. The method of claim 2, wherein the list is static.

4. The method of claim 2, wherein the list is maintained based on feedback between the nodes.

5. The method of claim 2, wherein the signal is further based on the list.

6. The method of claim 1, wherein the characteristic of the first receiver node is SNR relative to the transmitter node, and the characteristic of the second receiver node is SNR relative to the transmitter node.

7. The method of claim 1, further comprising determining the scale factor based at least in part on a SNR of the first receiver node relative to the transmitter node and a SNR of the second receiver node relative to the transmitter node.

8. The method of claim 1, wherein the step of identifying a primary message and at least one secondary message further comprises searching a message queue for a most-forward packet capable of piggybacking and/or being piggybacked.

9. A method of relaying messages over a communications network, the method comprising:
   identifying a transmitter node and at least two receiver nodes that are geographically separated from each other;
   identifying a primary message and at least one secondary message to be transmitted from the transmitter node, each message being stored in a message queue, and each message including packets of data;
   determining a next packet of the primary message to be transmitted;
   identifying possible partner links between nodes in the network that are capable of supporting piggybacking for the next packet;
   generating a full message by piggybacking a packet of each of secondary message onto the next packet of the primary message in response to a signal indicating piggybacking is possible; and,
   transmitting the full message at a same power level,
   wherein the signal is based at least in part on relative signal-to-noise ratios of the at least two receiver nodes with respect to the transmitter node, wherein the piggybacking of a packet of each secondary message onto the next packet of the primary message further comprises:
   for each secondary message, identifying a piggyback packet by searching the message queue for the most forward secondary packet that uses a partner link;
   scaling each piggyback packet according to link signal-to-noise ratio; and,
   combining the next packet and each piggyback packet.

10. The method of claim 9, wherein the scaling is based at least in part on the signal-to-noise ratios of the receivers relative to the transmitter.

11. The method of claim 9, further comprising estimating a link signal-to-noise ratio for each link between nodes in the network.

12. The method of claim 11, further comprising estimating the link signal-to-noise ratio for each partner link based at least in part on substantially constant feedback between nodes.

13. The method of claim 12, wherein the estimates are made on-the-fly.

14. A system for relaying messages over a communications network, comprising:
   a transmitter node and at least two receiver nodes, the transmitter node and the at least two receiver nodes being configured to communicate at least a primary message and at least one secondary message therebetween and wherein said at least two receiver nodes are geographically separated from each other;
   wherein the primary message and the at least one secondary message are to be sent from the transmitter node to the at least two receiver nodes based at least in part on a comparison of signal-to-noise ratios of the at least two receiver nodes relative to the transmitter node,
   wherein the primary message and the at least one secondary message are to be piggybacked based at least in part on the comparison and transmitted at the same power level, and wherein each node comprises a piggybacking mechanism, the piggybacking mechanism including:
  a scaler operable to scale the at least one secondary message to form a scaled message; and,
  a summer operable to sum the scaled message and the primary message.

15. The system of claim 14, further comprising a message queue associated with a node operable to store messages to be communicated.

16. The system of claim 15, further comprising a list of SNRs for each link between nodes in the network.

17. The system of claim 16, wherein the nodes are operable to update the list.

18. The system of claim 16, further comprising a list including comparisons for each link between nodes in the network.

19. The system of claim 15, wherein the message queue is operable to output a most-forward packet capable of piggybacking and/or being piggybacked.

20. The system of claim 14, wherein the primary message and the at least one secondary message are piggybacked if the comparison indicates a substantial SNR for the at least two receiver nodes relative to the transmitter node.

21. The system of claim 20, wherein the substantial SNR is 100:1.

22. A system for relaying messages over a communications network, comprising:
  means for identifying a primary message and at least one secondary message to be communicated from a transmitter, the primary message being designated for a first receiver node and the at least one secondary message being designated for a second receiver node, wherein said first and second receiver nodes are geographically separated from each other;
  means for piggybacking the at least one secondary message onto the primary message to form a piggybacked message in response to a signal indicating that piggybacking of the at least one secondary message onto the primary message is possible, the signal being based at least in part on a characteristic of the first receiver node and the second receiver node relative to the transmitter node;
  the means for piggybacking cooperating with a scaler operable to scale the at least one secondary message to form a scaled message and a summer operable to sum the scaled message and the primary message, in piggybacking the at least one secondary message onto the primary message,
  a transmitter configured to transmit the primary message and the piggybacked message at a same power level.

23. A method of relaying messages over a communications network, the method comprising:
  identifying a first message to be communicated by a first antenna of a transmitter node and a secondary message to be communicated by a second antenna of the transmitter node, the first antenna and the second antenna having substantially distinctive antenna apertures;
  communicating substantially non-orthogonally at substantially the same time over substantially the same channel the first message and the second message using the first antenna and the second antenna in dependence on a breakpoint difference between near and far field regions of the network;
  receiving the first message and the second message by a receiver node having two antennas with distinct apertures; and,
  scaling and separating the messages in dependence on the antenna apertures; and
  receiving the second message by a second receiver node geographically separated from the first receiver node.

24. The method of claim 23, wherein the first antenna has a signal drop-off rate of approximately $1/r^2$ and the second antenna has a signal drop-off rate of approximately $1/r^3$.

25. A computer implemented method of relaying messages over a communications network, the method comprising:
  using at least one computer having at least one processor for performing the following:
  identifying a primary message and at least one secondary message to be communicated from at least one transmitter node, the primary message being designated for one or more first receiver nodes and the at least one secondary message being designated for one or more second receiver nodes, the one or more first receiver nodes being geographically separated from the one or more second receiver nodes;
  scaling the at least one secondary message by a scale factor to form a scaled message; and,
  summing the primary message and the scaled message; and
  piggybacking the scaled message onto the primary message to form a substantially non-orthogonal piggybacked message such that the primary message and the at least one secondary message are capable of being transmitted at substantially the same time over substantially the same channel and at a same power level,
  wherein the piggybacking is performed in dependence on predefined SNRs between the at least one transmitter node, and the one or more first receiver nodes and the one or more second receiver nodes.

26. The method of claim 25, further comprising when a receiver node receives a message, processing the message in dependence on whether the message is a piggybacked message.

27. The method of claim 25, wherein the piggybacked message includes multicast information.

28. A system for relaying messages over a communications network, comprising:
  a transmitter node and at least two receiver nodes, the transmitter node and the at least two receiver nodes being configured to communicate at least a primary message and at least one secondary message therebetween and wherein the at least two receiver nodes are geographically separated from each other;
  wherein the primary message and the at least one secondary message are piggybacked to form a substantially non-orthogonal piggybacked message, such that the primary message and the at least one secondary message are capable of being transmitted at substantially the same time over substantially the same channel and at a same power level, the at least one secondary message being scaled by a scale factor to form a scaled message that is summed with the primary message as a part of the piggybacking,
  wherein the primary message and the at least one secondary message are piggybacked in dependence on predefined SNRs between the transmitter node and the at least two receiver nodes.

29. The system of claim 28, wherein each receiver node is further operable to process a received message in dependence on whether the received message is a piggybacked message.

30. The system of claim 28, wherein the primary message is broadcast for one or more receiver nodes.

31. The system of claim 28, wherein the piggybacked message includes multicast information.

32. A transmitter node comprising an encoder processor for preparing a message to be relayed through a network of nodes, the encoder processor comprising a piggybacking module configured to generate a piggybacked message by piggybacking at least one secondary message designated for at least one second receiver node onto a primary message designated for at least one first receiver node based at least in part on a comparison of signal-to-noise ratios of the receiver nodes relative to the transmitter node, wherein the receiver nodes are geographically separated from each other and wherein the piggybacked message is transmitted at one power level, the piggybacking being performed by scaling the at least one secondary message by a scale factor to form a scaled message and summing together the primary message and the scaled message.

33. The transmitter node of claim 32, further comprising a transmitting module for transmitting at least one of the piggybacked message, the primary message, and the at least one secondary message based at least in part on the comparison.

34. A transmitter node comprising an encoder processor for preparing a message to be relayed over a communications network, the encoder processor comprising a piggybacking module configured to generate a piggybacked message by piggybacking at least one secondary message designated for at least one second receiver node onto a primary message designated for at least one first receiver node, the piggybacked message being substantially non-orthogonal, such that the primary message and the at least one secondary message are capable of being transmitted at substantially the same time over substantially the same channel and at a same power level, wherein the receiver nodes are geographically separated from each other, and wherein the primary message and the at least one secondary message are piggybacked in dependence on a comparison of signal-to-noise ratios between the transmitter node and the receiver nodes, the node further comprising:

a scaler operable to scale the at least one secondary message to form a scaled message; and, a summer operable to sum the scaled message and the primary message, in connection with the piggybacking.

35. A receiver node comprising a decoder processor for processing a message received from a transmitter node, the decoder processor comprising a separating module configured to separate a primary message designated for at least one first receiver node from at least one secondary message designated for at least one second receiver node based at least in part on a comparison of signal-to-noise ratios of the receiver nodes relative to the transmitter node, the primary message and the at least one secondary message being included in a received piggybacked message, wherein the receiver nodes are geographically separated from each other, the primary message and the piggybacked message having been transmitted at a same power level, the at least one secondary message having been scaled by a scale factor to form a scaled message, the scaled message having been summed together with the primary message.

36. The receiver node of claim 35, further comprising a switch configured to control decoding and/or piggybacking.

37. A receiver node comprising a decoder processor for processing a message relayed over a communications network, the decoder processor comprising a separating module configured to separate a substantially non-orthogonal piggybacked message by separating at least one secondary message designated for at least one second receiver node from a primary message designated for at least one first receiver node, wherein the receiver nodes are geographically separated from each other, the primary message and the piggybacked message having been transmitted at a same power level, the at least one secondary message having been scaled by a scale factor to form a scaled message, the scaled message having been summed together with the primary message.

38. The receiver node of claim 37, further comprising a switch configured to control decoding and/or piggybacking.

\* \* \* \* \*